US012792009B2

(12) United States Patent
Tolis et al.

(10) Patent No.: US 12,792,009 B2
(45) Date of Patent: Nov. 10, 2026

(54) SYSTEMS AND METHODS FOR RECONCILIATION OF CONFLICTING MEASUREMENTS AND INDUSTRIAL OPTIMIZATION

(71) Applicant: Actium Liquidity Partners, Inc., Boston, MA (US)

(72) Inventors: Athanassios George Tolis, London (GB); Toby Joe Mitchell, Letchworth Garden City (GB)

(73) Assignee: Actium Liquidity Partners, Inc., Boston, MA (US)

( * ) Notice: Subject to any disclaimer, the term of this patent is extended or adjusted under 35 U.S.C. 154(b) by 1039 days.

(21) Appl. No.: 17/737,459

(22) Filed: May 5, 2022

(65) Prior Publication Data

US 2023/0023784 A1 Jan. 26, 2023

Related U.S. Application Data

(60) Provisional application No. 63/184,783, filed on May 5, 2021.

(51) Int. Cl.
*G05B 19/4155* (2006.01)

(52) U.S. Cl.
CPC .................... *G05B 19/4155* (2013.01); *G05B 2219/32291* (2013.01)

(58) Field of Classification Search
CPC .................. G05B 19/4155; G05B 2219/32291
See application file for complete search history.

(56) References Cited

U.S. PATENT DOCUMENTS

| | | | | |
|---|---|---|---|---|
| 6,317,646 | B1 * | 11/2001 | de Caussin | G05B 19/40937 700/193 |
| 11,237,563 | B2 * | 2/2022 | Javault | A01D 46/30 |
| 12,403,950 | B2 * | 9/2025 | Calderon | B62D 6/00 |

* cited by examiner

*Primary Examiner* — Elias Desta

(57) ABSTRACT

Systems and methods in automated systems for reconciling conflicting measurements, optimizing operations, and, when a system operator overrides system parameters, reducing errors.

12 Claims, 14 Drawing Sheets

602

| | | |
|---|---|---|
| A | B | C |

600

| | | | | | |
|---|---|---|---|---|---|
| A | B | C | D | E | 604 |
| A | B | C | E | D | |
| A | B | E | C | D | |
| A | E | B | C | D | |
| E | A | B | C | D | |
| A | B | D | C | E | 606 |
| A | B | D | E | C | |
| A | B | E | D | C | |
| A | E | B | D | C | |
| E | A | B | D | C | |
| A | D | B | C | E | 608 |
| A | D | B | E | C | |
| A | D | E | B | C | |
| A | E | D | B | C | |
| E | A | D | B | C | |
| D | A | B | C | E | 610 |
| D | A | B | E | C | |
| D | A | E | B | C | |
| D | E | A | B | C | |
| E | D | A | B | C | |

FIG. 6

SYSTEMS AND METHODS FOR RECONCILIATION OF CONFLICTING MEASUREMENTS AND INDUSTRIAL OPTIMIZATION

CLAIM OF PRIORITY

This application claims priority to and the benefit of U.S. Provisional Application No. 63/184,783, filed May 5, 2021, and entitled "SYSTEMS AND METHODS FOR RECONCILIATION OF CONFLICTING MEASUREMENTS AND INDUSTRIAL OPTIMIZATION" which is incorporated by reference herein in its entirety.

FIELD OF INVENTION

The present invention relates to systems and methods for reconciling conflicting measurements and optimizing automated operations in industrial systems, manufacturing systems, medical systems, and the like and for reducing errors when an operator overrides the system parameters.

BACKGROUND

Computer-controlled systems are utilized in many industries. Computer automation allows complex computer-controlled systems to function continuously with reduced need for human interaction. Operational system parameters, also known as system "guardrails," are used to limit system operation to acceptable levels to optimize system performance, economize on resource usage, maximize safety, and satisfy other operational criteria. Human oversight over such system guardrails is often desirable, if not necessary, to permit rapid adaptation to changing operational circumstances, prevention of foreseeable accidents, and detection and correction of errors, including computer, system, and human errors. However, human oversight is not flawless either.

It is well understood that a human operator can only access and understand a limited amount of information in a given amount of time, and then requires additional time to decide upon a course of action. For example, real-time measurements of an industrial process can provide an overwhelming amount of data to a human operator that can take years to fully analyze and comprehend. Certain decision-making needed for system operation may require complicated computations that cannot be performed by a human operator within a useful timeframe at all. Teams of highly experienced accident reconstruction experts are all-too-frequently called upon to analyze industrial accidents, identify flaws in system design, review operator decisions, and propose remedial adjustments, including the adjustment of system guardrails, to avoid further catastrophes and other levels of suboptimal performance. Given the volumes of data to be analyzed, error-checked, and cross-referenced, it can be impossible for a human (or team of humans) to determine which system guardrails should be adjusted and to what extent. A computer-controlled system requiring rapid system guardrail adjustment can be impossible for a human to effectively monitor and oversee.

In a tedious, manual process, human operators may preset default guardrails to address different permutations of hypothetical operational scenarios. Assuming a particular set of system inputs, such as measurements from different sensors in different parts of an industrial system, a human operator can attempt to predict one or more appropriate guardrails to prevent suboptimal operation. With only four sensor inputs, there can be twenty-four permutations (=4!), with five sensor inputs, there can be one-hundred-and-twenty permutations (=5!), with six sensor inputs, there can be seven-hundred-and-twenty permutations (=6!), and so on. In a modern industrial system, the sheer number of potential sensor input permutations can easily overwhelm a human operator. Complicating any analysis, each sensor input is subject to failure, tolerance adjustment, erroneous operation, external influence, and the like. In the following, the term "sensor" can be used to refer to measurement instruments, detection instruments, valuation instruments, and the like.

FIG. 1 shows an industrial control system according to the prior art. System 100 comprises sensors 102-1, 102-2, 102-3, and 102-4; sensor preference database 104; industrial control system 106; and manufacturing system 108 which includes machines 110-1, 110-2, 110-3 through 110-N. Sensors 102-1, 102-2, 102-3, and 102-4 provide conventional measurement data to control system 106. Such measurement data may include temperature, flowrate, weight, quantity, price, and voltage. Importantly, sensors 102-1, 102-2, 102-3, and 102-4 may all measure the same particular type of quantity, e.g., all four sensors may measure the temperature of a body, the speed of a vehicle, the weight of an object, the price of a security, or the voltage at a location in a circuit.

Database 104 is prestored with static individual sensor preferences, specifically control system guardrails, regarding the utilization of measurement data from each individual sensor 102-1, 102-2, 102-3, and 102-4. The guardrails stored in database 104 are significantly limited in that they apply to the fixed group of sensors 102-1, 102-2, 102-3, and 102-4. The removal or malfunction of one of sensors 102-1, 102-2, 102-3, and 102-4 renders the guardrails in database 104 unusable. Similarly, the addition of another sensor to provide measurement data to control system 106 also renders the guardrails in database 104 inadequate and necessarily obsolete. New guardrails for an expanded set of sensors would need to be stored in database 104 to accommodate the increased number of sensor measurement permutations resulting from the presence of the additional sensor. For example, database 104 may be prestored with a guardrail requiring control system 106 to always utilize the second highest measurement value recorded by sensors 102-1, 102-2, 102-3, and 102-4, regardless of which sensor provided that measurement value. If, however, one of the sensors 102-1, 102-2, 102-3, and 102-4 is removed, that guardrail may be rendered useless. Alternatively, if a new sensor is added, guardrails stored in database 104 may need to be updated to address the increased number of measurement permutations resulting from the expanded set of sensors.

Control system 106 implements a conventional operational algorithm based upon the measurement data provided by sensors 102-1, 102-2, 102-3, and 102-4 and limited by the individual static guardrails stored in database 104. The operational algorithm is implemented in control system 106 to control the operation of manufacturing system 108. Such control may extend to the control of individual machines 110-1, 110-2, and 110-3 through 110-N within system 108. The prestored guardrails in database 104, preset by a human operator, are utilized by control system 106 to prevent the operational algorithm from exceeding the operational parameters preset by the human operator.

Inherently, the guardrails that a human operator can manually set in advance of the operation of control system 106 are limited. In a manual guardrail setting operation, the human operator must take time to analyze each sensor measurement permutation and set each guardrail for proper operation accordingly. Human error is introduced into the guardrails by poor analyses, inconsistent decisions, and other mistakes, both foreseeable and unforeseeable. The dynamic nature of sensor measurement reliability and utility of different sensors can make a manual guardrail setting operation practically impossible. Such changes may occur at a rate faster than a human can even comprehend let alone react to properly in order to adjust one or more guardrails. The addition of more system sensors can cause a more-than-geometric increase in the permutations of sensor measurement data that the human operator will face in attempting to set system guardrails. As the complexity of the system increases, it becomes more difficult for a human operator to implement rational, consistent guardrails to provide desired system operation. Unable to cope with such complexity in a manual guardrail setting operation, the human operator is left to make rough approximations and coarse guardrail adjustments tending to result in inefficient operations or no guardrail adjustments at all.

Ideally, the human operator provides a system guardrail for every single possible permutation of sensor measurement data. For example, if the sensor data includes: (1) a low measurement from a first instrument (LM1), (2) a high measurement from a second instrument (HM2) and (3) a middle measurement from a third instrument (MM3) then there are six different permutations (i.e., 3! permutations) for their order:

| | | | |
|---|---|---|---|
| (i) | LM1 | MM3 | HM2 |
| (ii) | LM1 | HM2 | MM3 |
| (iii) | MM3 | LM1 | HM2 |
| (iv) | MM3 | HM2 | LM1 |
| (v) | HM2 | MM3 | LM1 |
| (vi) | HM2 | LM1 | MM3 |

Typically, among the above six potential permutations of sensor measurement data, only the first one (permutation (i)) reflects typically "normal" system operation (i.e., the low measurement is less than the middle measurement which is less than the high measurement) and the other five permutations (permutations (ii)-(vi)) are outliers caused by "abnormal" conditions such as erroneous sensor operation, erroneous system operation, unusual system input conditions, changing external conditions, local sensor conditions that are not actually representative, or combinations of the above. As more sensors are added to provide more particularized sensor measurement data, redundant measurements, or other bases for error detection and correction capabilities, more permutations of sensor measurement data result (as explained above) requiring more specific judgments.

As more permutations of sensor measurement data are considered, the human operator inevitably faces the human limits of consistency and the human tendency towards distraction by irrelevant, or less relevant, measurement data. Adding new sensor measurement data frequently inspires human operators to revise their view of the collection of sensor measurement data and, in particular, their ranking of the relative importance (or reliability) of particular sensor measurement data. More generally, the appearance of new data (or source) can inspire an individual to change a prior relative ranking of a pre-existing set of data (or source) in a manner that is objectively inconsistent. Interestingly, the change in relative ranking may or may not be objectively erroneous depending on the impact of the new choice on the other choices or on the understanding of the human operator based on the newly-available information. This aspect of human behavior is generally understood in connection with the theory of "Independence of Irrelevant Alternatives" posited by Kenneth Arrow. See, generally, https://en.wikipedial.org/wiki/Independence_of_irrelevant_alternatives#In_social_choice. The human tendency to re-evaluate rankings in the presence of new information may be useful in certain circumstances but simply catastrophic in others. In the context of this theory, the term "irrelevant" generally refers to information that should not, from a logical perspective, affect the ranking of previously ranked preferences.

For example, in an industrial system where three measurements deemed reliable are utilized to calculate a system operational parameter, the sudden availability of a new outlier sensor measurement should not necessarily be allowed to impact the human operator's system parameter calculation. The time and effort required to re-evaluate the newly-enlarged set of sensor measurement data may simply not be worth the expense of re-evaluating that set of data nor be less than the potential benefit obtainable by further refining the system parameter calculation. Even if the new sensor measurement data is not an outlier, there can be circumstances where the additional data is still irrelevant to the calculated system operation parameter, e.g., because the tolerances of the new sensor are the same as those of the sensors used to obtain the pre-existing sensor measurement data. Alternatively, the additional sensor measurement data may be irrelevant because the accuracy or precision of the sensor is not known or is known to be unreliable. Or, the additional sensor measurement data may simply be irrelevant because it is considered unreliable because it contradicts pre-existing sensor measurement data.

Conversely, situations exist when a new sensor measurement inspires analysis of the previous sensor measurements in a new context, in which case, the new sensor measurement is not "irrelevant." For example, the introduction of a new third candidate in a political election very often will cause certain voters to change their original ranking of the two original candidates (in terms of preference for the political office) even though those particular two candidates did not change. This may be referred to as the "spoiler effect."

Along the same lines, in the context of an auction for a piece of art, the sudden appearance of an anonymous bidder who bids at a much higher level than an existing set of bidders could either be relevant or irrelevant to the set of other bidders. If the pre-existing set of bidders are fully informed regarding the value of the piece of art being auctioned, they should not be swayed by the actions of the anonymous bidder. However, if the pre-existing set of bidders are not sure about the value of the piece of art, the higher new bid will contain information that the other bidders will often consider in formulating or adjusting their bids.

Similarly, the removal of a choice may cause an individual to re-rank the remaining choices in a different order even though the existence or absence of the additional choice is objectively irrelevant to the other remaining choices. This behavior frequently appears in the presidential elections in France where voters first cast a "tactical" vote on one side of the "right-to-left" spectrum and swing to the opposite side of the spectrum in the second round after the number of candidates has been reduced. This is resolutely not the type of behavior that makes sense when medicating a patient or maintaining an industrial process temperature and may even be illegal when it comes to showing prices for financial securities (e.g., Dodd Frank section 747). Under circumstances such as those, there can be a need for tools to ensure that the independence of irrelevant alternatives is respected.

Human operators of an automated process all too frequently fall in the trap of being distracted by irrelevant alternatives appearing or disappearing. Particularly serious consequences can result from such errors impacting the process for setting guardrails for an automated process. For example, the guardrails may serve as a fail-safe mechanism to reduce the potential harm caused by human error. In many cases, the introduction of a new source of measurement data should not be allowed to affect the operator's choice of a guardrail among the pre-existing measurement data.

SUMMARY

The need exists to assist the human user managing an automated process to prevent action based upon irrelevant distractions caused by the introduction of a new irrelevant measurement or the removal of an existing measurement. The positioning of a guardrail should not be allowed to change due to the distracting new irrelevant information, and preferably should be positioned to remain consistent with other pre-existing guardrails. Similarly, there will be circumstances where the quality of a guardrail should not be allowed to change due to the distraction caused by new irrelevant information.

In certain applications, the existence of a predetermined relationship for a pair of guardrails may be important. For example, it may be strongly preferred that the physical guardrails on a winding road be a fixed distance apart to allow for two lanes of vehicular traffic. Asymmetric or otherwise unexpected changes to the position of a pair of guardrails may lead to driver confusion and accidents. The narrowing of a two-lane road by reducing the distance between the guardrails presents an anomaly for drivers on that road and may constitute a distraction that results in an accident. Similarly, changing the position of one guardrail on a road without making a symmetric adjustment of the position of the other guardrail may be another source of troublesome distraction to a human driver.

In industrial applications, the symmetry of automated process guardrails may also be important. Guardrails in the form of a pair of limits, e.g., a lower limit and an upper limit, may be optimal for certain types of manufacturing processes. The relationship between the lower and upper limits may be optimized as a fixed relationship or a dynamic, albeit predictable, relationship. Circumstances may require multiple predetermined sets of guardrails to accommodate different operating conditions. For example, for a furnace it may be advantageous to modify the flow rate of fuel versus the flow rate of oxygen into the furnace to optimize the amount of heat generated per unit of fuel. When more heat is needed, however, the flow rates may need to increase in a proportional manner. An upper limit guardrail on the utilization of fuel may be conditional upon the utilization of the oxygen. In an extreme example, the guardrails may serve as failsafe conditions to prevent catastrophic operation of furnace at too high of a temperature or to otherwise govern operations when other control systems fail.

In treating certain medical conditions, symmetrical guardrails may be applied to protect a patient from an overdosing or underdosing condition, each which may cause the patient harm. For example, a diabetes patient that receives too little insulin may suffer from blood sugar levels that are too high. That same patient who receives too much insulin may suffer from blood sugar levels that are too low. Guardrails imposed upon an automatic insulin dispensing system can help prevent both erroneous dosing scenarios. In this way, the patient can more reliably receive an appropriate, if not optimized, amount of medication.

As another example, guardrails may be employed to provide default limits on currency exchange transactions. If communications are disrupted or corrupted, reliable currency exchange information may not be available for a real-time transaction. Symmetrical guardrails may be set for maximum and minimum exchange rates at a fixed offset from the last available reliable exchange rate data, e.g., yesterday's average exchange rate. Assuming sufficient transaction volume, the guardrail rate for exchanging currency A for currency B can be symmetrical with the guardrail rate for exchanging currency B for currency A. Alternatively, the two guardrail exchange rates may be asymmetric to increase or decrease the currency exchange risk that a party takes.

Dynamic adjustment of guardrails is also preferable in many circumstances. A human operator may desire to change guardrails to accept increased or decreased risk reflecting changes perceived by the human operator such as environmental conditions, patient considerations, market conditions, and the like. For example, news of an impending hurricane or offshore earthquake should immediately lead to the adoption of a more "conservative" collection of guardrails on the operational parameters for a power station that is in the path of potential destruction. When there are hundreds of permutations of ordered measurements on which the guardrails depend, it can be very advantageous that a predetermined course of action be available for the human operator to select a more conservative collection of guardrails.

Systems and methods according to embodiments of the invention solve these and other problems in the prior art related to the setting of guardrails for industrial, medical, and financial systems. Embodiments of the invention advantageously enable a human operator to set and adjust guardrails to better control the operation of a computer-controlled system.

According to an aspect of the invention, an automated measurement method includes the steps of displaying in a first display region six different first set permutations of three measurement ranges, each measurement range including a measurement from a respective measurement device and bounded in part by a measurement from another measurement device; receiving a user selection of a respective selected measurement range in each first set permutation; displaying with a first graphic identifier the respective selected measurement range in each first set permutation; displaying in a second display region twenty-four second set permutations of the three measurement ranges and a fourth measurement range; displaying with a second graphic identifier at least one measurement range in each second set permutation within the respective selected measurement range of the first set permutation comprising measurement ranges in the same order as the respective second set permutation; receiving a user choice of a respective chosen second measurement range in each second set permutation; and for each second set permutation, determining whether the respective chosen second measurement range is within the respective selected measurement range of the first set permutation comprising measurement ranges in the same order as the respective second set permutation.

According to a second aspect of the invention, an automated measurement method includes the steps of receiving a tolerance-adjusted low measurement from a first instrument; receiving a tolerance-adjusted high measurement from the first instrument; receiving a middle measurement from a second instrument; determining that the middle measurement is less than the tolerance-adjusted low measurement; determining that the tolerance-adjusted low measurement is less than the tolerance-adjusted high measurement; retrieving, from a data storage containing a plurality of preselected user preferences for maximum output based on three measurements, a preselected user maximum-output preference for a second tolerance-adjusted low measurement from the first instrument in response to the second tolerance-adjusted low measurement less than a second tolerance-adjusted high measurement from the first instrument less than a second middle measurement from the second instrument; transmitting a minimum output signal to a control system based on the tolerance-adjusted high measurement; and limiting the minimum output of an apparatus with the control system based on the minimum output signal.

According to a third aspect of the invention, an automated measurement method includes the steps of receiving a tolerance-adjusted low measurement from a first instrument; receiving a tolerance-adjusted high measurement from the first instrument; receiving a middle measurement from a second instrument; determining that the middle measurement is less than the tolerance-adjusted low measurement; determining that the tolerance-adjusted low measurement is less than the tolerance-adjusted high measurement; retrieving, from a data storage containing a plurality of preselected user preferences for maximum output based on three measurements, a preselected user maximum-output preference for a second tolerance-adjusted high measurement from the first instrument in response to a second tolerance-adjusted low measurement from the first instrument less than the second tolerance-adjusted high measurement less than a second middle measurement from the second instrument; transmitting a minimum output signal to a control system based on the tolerance-adjusted low measurement; and limiting the minimum output of an apparatus with the control system based on the minimum output signal.

According to a fourth aspect of the invention, an automated measurement method includes the steps of receiving a tolerance-adjusted low measurement from a first instrument; receiving a tolerance-adjusted high measurement from the first instrument; receiving a middle measurement from a second instrument; determining that to tolerance-adjusted low measurement is less than the middle measurement; determining that the middle measurement is less than the tolerance-adjusted high measurement; retrieving, from a data storage containing a plurality of preselected user preferences for maximum output based on three measurements, a preselected user maximum-output preference for a second tolerance-adjusted low measurement from the first instrument in response to the second tolerance-adjusted low measurement less than a second middle measurement from the second instrument less than a second tolerance-adjusted high measurement from the first instrument; transmitting a minimum output signal to a control system based on the tolerance-adjusted high measurement; and limiting the minimum output of an apparatus with the control system based on the minimum output signal.

According to a fifth aspect of the invention, an automated measurement method includes the steps of receiving a tolerance-adjusted low measurement from a first instrument; receiving a tolerance-adjusted high measurement from the first instrument; receiving a middle measurement from a second instrument; determining that the tolerance-adjusted low measurement is less than the middle measurement; determining that the middle measurement is less than the tolerance-adjusted high measurement; retrieving, from a data storage containing a plurality of preselected user preferences for maximum output based on three measurements, a preselected user maximum-output preference for a second middle measurement from the second instrument in response to a second tolerance-adjusted low measurement less than the second middle measurement less than the second tolerance-adjusted high measurement from the first instrument; transmitting a minimum output signal to a control system based on the second middle measurement; and limiting the minimum output of an apparatus with the control system based on the minimum output signal.

According to a sixth aspect of the invention, an automated measurement method includes the steps of receiving a tolerance-adjusted low measurement from a first instrument; receiving a tolerance-adjusted high measurement from the first instrument; receiving a middle measurement from a second instrument; determining that the tolerance-adjusted low measurement is less than the middle measurement; determining that the middle measurement is less than the tolerance-adjusted high measurement; retrieving, from a data storage containing a plurality of preselected user preferences for maximum output based on three measurements, a preselected user maximum-output preference for a second tolerance-adjusted high measurement from the first instrument in response to a second tolerance-adjusted low measurement from the first instrument less than a second middle measurement from the second instrument less than the second tolerance-adjusted high measurement; transmitting a minimum output signal to a control system based on the tolerance-adjusted low measurement; and limiting the minimum output of an apparatus with the control system based on the minimum output signal.

According to a seventh aspect of the invention, an automated measurement method includes the steps of receiving a tolerance-adjusted low measurement from a first instrument; receiving a tolerance-adjusted high measurement from the first instrument; receiving a middle measurement from a second instrument; determining that the tolerance-adjusted high measurement is less than the middle measurement; determining that the middle measurement is less than the tolerance-adjusted low measurement; retrieving, from a data storage containing a plurality of preselected user preferences for maximum output based on three measurements, a preselected user maximum-output preference for a second tolerance-adjusted high measurement from the first instrument in response to the second tolerance-adjusted high measurement less than a second middle measurement from the second instrument less than a second tolerance-adjusted low measurement from the first instrument; transmitting a minimum output signal to a control system based on said tolerance-adjusted low measurement; and limiting the minimum output of an apparatus with said control system based on said minimum output signal.

According to an eighth aspect of the invention, an automated measurement method includes the steps of receiving a tolerance-adjusted low measurement from a first instrument; receiving a tolerance-adjusted high measurement from the first instrument; receiving a middle measurement from a second instrument; determining that the middle measurement is less than the tolerance-adjusted high measurement; determining that the tolerance-adjusted high measurement is less than the tolerance-adjusted low measurement; retrieving, from a data storage containing a plurality of preselected user preferences for maximum output based on three measurements, a preselected user maximum-output preference for a second tolerance-adjusted low measurement from the first instrument in response to a second tolerance-adjusted high measurement from the first instrument less than the second tolerance-adjusted low measurement less than a second middle measurement from the second instrument; transmitting a minimum output signal to a control system based on the tolerance-adjusted high measurement; and limiting the minimum output of an apparatus with the control system based on the minimum output signal.

According to a ninth aspect of the invention, an automated measurement method includes the steps of receiving a tolerance-adjusted low measurement from a first instrument; receiving a tolerance-adjusted high measurement from said the instrument; receiving a middle measurement from a second instrument; determining that the tolerance-adjusted low measurement is less than the tolerance-adjusted high measurement; determining that the tolerance-adjusted high measurement is less than the middle measurement; retrieving, from a data storage containing a plurality of preselected user preferences for maximum output based on three measurements, a preselected user maximum-output preference for a second tolerance-adjusted low measurement from the first instrument in response to a second middle measurement from the second instrument less than the second tolerance-adjusted low measurement less than a second tolerance-adjusted high measurement from the first instrument; transmitting a minimum output signal to a control system based on the tolerance-adjusted high measurement; and limiting the minimum output of an apparatus with the control system based on the minimum output signal.

According to a tenth aspect of the invention, an automated measurement method includes the steps of receiving a tolerance-adjusted low measurement from a first instrument; receiving a tolerance-adjusted high measurement from the first instrument; receiving a middle measurement from a second instrument; determining that the tolerance-adjusted high measurement is less than the tolerance-adjusted low measurement; determining that the tolerance-adjusted low measurement is less than the middle measurement; retrieving, from a data storage containing a plurality of preselected user preferences for maximum output based on three measurements, a preselected user maximum-output preference for a second tolerance-adjusted high measurement from the first instrument in response to a second middle measurement from the second instrument less than the second tolerance-adjusted high measurement less than a second tolerance-adjusted low measurement from the first instrument; transmitting a minimum output signal to a control system based on the tolerance-adjusted low measurement; and limiting the minimum output of an apparatus with the control system based on the minimum output signal.

According to an eleventh aspect of the invention, an automated measurement method includes the steps of receiving a tolerance-adjusted low measurement from a first instrument; receiving a tolerance-adjusted high measurement from the first instrument; receiving a middle measurement from a second instrument; receiving an alternate middle measurement from a third instrument; determining that the middle measurement from the first instrument is less than the tolerance-adjusted low measurement; determining that the tolerance-adjusted low measurement is less than the tolerance-adjusted high measurement; determining that the tolerance-adjusted high measurement is less than the alternate middle measurement; retrieving, from a data storage containing a plurality of preselected user preferences for maximum output based on four measurements, a preselected user maximum-output preference for a second tolerance-adjusted low measurement from the first instrument in response to a second alternate middle measurement from the third instrument less than the second tolerance-adjusted low measurement less than a second tolerance-adjusted high measurement from the first instrument less than a second middle measurement from the second instrument; transmitting a minimum output signal to a control system based on the tolerance-adjusted high measurement; and limiting the minimum output of an apparatus with the control system based on the minimum output signal.

According to a twelfth aspect of the invention, an automated measurement method includes the steps of receiving a tolerance-adjusted low measurement from a first instrument; receiving a tolerance-adjusted high measurement from the first instrument; receiving a middle measurement from the second instrument; receiving an alternate middle measurement from a third instrument; determining that the alternate middle measurement is less than the tolerance-adjusted low measurement; determining that the tolerance-adjusted low measurement is less than the middle measurement; determining that the middle measurement is less than the tolerance-adjusted high measurement; retrieving, from a data storage containing a plurality of preselected user preferences for maximum output based on four measurements, a preselected user maximum-output preference for a second tolerance-adjusted low measurement from the first instrument in response to the second tolerance-adjusted low measurement less than a second middle measurement from the second instrument less than a second tolerance-adjusted high measurement from the first instrument less than a second alternate middle measurement from the third instrument; transmitting a minimum output signal to a control system based on the tolerance-adjusted high measurement; and limiting the minimum output of an apparatus with the control system based on the minimum output signal.

According to a thirteenth aspect of the invention, an automated measurement method includes the steps of receiving a tolerance-adjusted low measurement from a first instrument; receiving a tolerance-adjusted high measurement from the first instrument; receiving a middle measurement from a second instrument; receiving an alternate middle measurement from a third instrument; determining that the alternate middle measurement is less than the tolerance-adjusted low measurement; determining that the tolerance-adjusted low measurement is less than the middle measurement; determining that the middle measurement from the second instrument is less than the tolerance-adjusted high measurement; retrieving, from a data storage containing a plurality of preselected user preferences for maximum output based on four measurements, a preselected user maximum-output preference for a second tolerance-adjusted high measurement from the first instrument in response to a second tolerance-adjusted low measurement from the first instrument less than a second middle measurement from the second instrument less than the second tolerance-adjusted high measurement less than a second alternate middle measurement from the third instrument; transmitting a minimum output signal to a control system based on the tolerance-adjusted low measurement; and limiting the minimum output of an apparatus with the control system based on the minimum output signal.

According to a fourteenth aspect of the invention, an automated measurement method includes the steps of receiving a tolerance-adjusted low measurement from a first instrument; receiving a tolerance-adjusted high measurement from the first instrument; receiving a middle measurement from a second instrument; receiving an alternate middle measurement from a third instrument; determining that said tolerance-adjusted low measurement is less than said alternate middle measurement; determining that the alternate middle measurement is less than the middle measurement from the second instrument; determining that the middle measurement is less than the tolerance-adjusted high measurement; retrieving, from a data storage containing a plurality of preselected user preferences for maximum output based on four measurements, a preselected user maximum-output preference for a second tolerance-adjusted low measurement from the first instrument in response to the second tolerance-adjusted low measurement less than a second middle measurement from the second instrument less than a second alternate middle measurement from the third instrument less than a second tolerance-adjusted high measurement from the first instrument; transmitting a minimum output signal to a control system based on the tolerance-adjusted high measurement; and limiting the minimum output of an apparatus with the control system based on the minimum output signal.

According to a fifteenth aspect of the invention, an automated measurement method includes the steps of receiving a tolerance-adjusted low measurement from a first instrument; receiving a tolerance-adjusted high measurement from the first instrument; receiving a middle measurement from a second instrument; receiving an alternate middle measurement from a third instrument; determining that the tolerance-adjusted low measurement is less than the alternate middle measurement; determining that the alternate middle measurement is less than the middle measurement; determining that the middle measurement is less than the tolerance-adjusted high measurement; retrieving, from a data storage containing a plurality of preselected user preferences for maximum output based on four measurements, a preselected user maximum-output preference for a second middle measurement from the second instrument in response to a second tolerance-adjusted low measurement from the first instrument less than the second middle measurement less than a second alternate middle measurement from the third instrument less than a second tolerance-adjusted high measurement from the first instrument; transmitting a minimum output signal to a control system based on the middle measurement; and limiting the minimum output of an apparatus with the control system based on the minimum output signal.

According to a sixteenth aspect of the invention, an automated measurement method includes the steps of receiving a tolerance-adjusted low measurement from a first instrument; receiving a tolerance-adjusted high measurement from the first instrument; receiving a middle measurement from a second instrument; receiving an alternate middle measurement from a third instrument; determining that the tolerance-adjusted low measurement is less than the alternate middle measurement; determining that the alternate middle measurement is less than the middle measurement; determining that the middle measurement is less than the tolerance-adjusted high measurement; retrieving, from a data storage containing a plurality of preselected user preferences for maximum output based on four measurements, a preselected user maximum-output preference for a second alternate middle measurement from the third instrument in response to a second tolerance-adjusted low measurement from the first instrument less than a second middle measurement from the second instrument less than the second alternate middle measurement less than a second tolerance-adjusted high measurement from the first instrument; transmitting a minimum output signal to a control system based on the alternate middle measurement; and limiting the minimum output of an apparatus with the control system based on the minimum output signal.

According to a seventeenth aspect of the invention, an automated measurement method comprising the steps of receiving a tolerance-adjusted low measurement from a first instrument; receiving a tolerance-adjusted high measurement from the first instrument; receiving a middle measurement from a second instrument; receiving an alternate middle measurement from a third instrument; determining that the tolerance-adjusted low measurement is less than the alternate middle measurement; determining that the alternate middle measurement is less than the middle measurement; determining that the middle measurement is less than the tolerance-adjusted high measurement; retrieving, from a data storage containing a plurality of preselected user preferences for maximum output based on four measurements, a preselected user maximum-output preference for a second tolerance-adjusted high measurement from the first instrument in response to a second tolerance-adjusted low measurement from the first instrument less than a second middle measurement from the second instrument less than a second alternate middle measurement from the third instrument less than the second tolerance-adjusted high measurement; transmitting a minimum output signal to a control system based on the tolerance-adjusted low measurement; and limiting the minimum output of an apparatus with the control system based on the minimum output signal.

According to an eighteenth alternate aspect of the invention, an automated measurement method includes the steps of receiving a tolerance-adjusted low measurement from a first instrument; receiving a tolerance-adjusted high measurement from the first instrument; receiving a middle measurement from a second instrument; receiving an alternate middle measurement from a third instrument; determining that the tolerance-adjusted low measurement is less than the middle measurement; determining that the middle measurement is less than the alternate middle measurement; determining that the alternate middle measurement is less than the tolerance-adjusted high measurement; retrieving, from a data storage containing a plurality of preselected user preferences for maximum output based on four measurements, a preselected user maximum-output preference for a second tolerance-adjusted low measurement from the first instrument in response to the second tolerance-adjusted low measurement less than a second alternate middle measurement from the third instrument less than a second middle measurement from the second instrument less than a second tolerance-adjusted high measurement from the first instrument; transmitting a minimum output signal to a control system based on the tolerance-adjusted high measurement; and limiting the minimum output of an apparatus with the control system based on the minimum output signal.

According to a nineteenth alternate aspect of the invention, an automated measurement method comprising the steps of receiving a tolerance-adjusted low measurement from a first instrument; receiving a tolerance-adjusted high measurement from the first instrument; receiving a middle measurement from a second instrument; receiving an alternate middle measurement from a third instrument; determining that the tolerance-adjusted low measurement is less than the middle measurement; determining that the middle measurement is less than the alternate middle measurement; determining that the alternate middle measurement is less than the tolerance-adjusted high measurement; retrieving, from a data storage containing a plurality of preselected user preferences for maximum output based on four measurements, a preselected user maximum-output preference for a second tolerance-adjusted high measurement from the first instrument in response to a second tolerance-adjusted low measurement from the first instrument less than a second alternate middle measurement from the third instrument less than a second middle measurement from the second instrument less than the second tolerance-adjusted high measurement; transmitting a minimum output signal to a control system based on the tolerance-adjusted low measurement; and limiting the minimum output of an apparatus with the control system based on the minimum output signal.

According to a twentieth aspect of the invention, an automated measurement method includes the steps of receiving a tolerance-adjusted low measurement from a first instrument; receiving a tolerance-adjusted high measurement from the first instrument; receiving a middle measurement from a second instrument; receiving an alternate middle measurement from a third instrument; determining that the tolerance-adjusted low measurement is less than the middle measurement; determining that the middle measurement is less than the tolerance-adjusted high measurement; determining that the tolerance-adjusted high measurement is less than the alternate middle measurement; retrieving, from a data storage containing a plurality of preselected user preferences for maximum output based on four measurements, a preselected user maximum-output preference for a second tolerance-adjusted low measurement from the first instrument in response to a second alternate middle measurement from the third instrument less than the second tolerance-adjusted low measurement less than a second middle measurement from the second instrument less than a second tolerance-adjusted high measurement from the first instrument; transmitting a minimum output signal to a control system based on the tolerance-adjusted high measurement; and limiting the minimum output of an apparatus with the control system based on the minimum output signal.

According to a twenty-first aspect of the invention, an automated measurement method includes the steps of receiving a tolerance-adjusted low measurement from a first instrument; receiving a tolerance-adjusted high measurement from the first instrument; receiving a middle measurement from a second instrument; receiving an alternate middle measurement from a third instrument; determining that the tolerance-adjusted low measurement is less than the middle measurement; determining that the middle measurement is less than the tolerance-adjusted high measurement; determining that the tolerance-adjusted high measurement is less than the alternate middle measurement; retrieving, from a data storage containing a plurality of preselected user preferences for maximum output based on four measurements, a preselected user maximum-output preference for a second tolerance-adjusted high measurement from the first instrument in response to a second alternate middle measurement from the third instrument less than a second tolerance-adjusted low measurement from the first instrument less than a second middle measurement from the second instrument less than the second tolerance-adjusted high measurement; transmitting a minimum output signal to a control system based on the tolerance-adjusted low measurement; and limiting the minimum output of an apparatus with the control system based on said minimum output signal.

According to a twenty-second aspect of the invention, an automated measurement method includes the steps of receiving a tolerance-adjusted low measurement from a first instrument; receiving a tolerance-adjusted high measurement from the first instrument; receiving a middle measurement from a second instrument; receiving an alternate middle measurement from a third instrument; determining that the tolerance-adjusted high measurement is less than the middle measurement; determining that the middle measurement is less than the tolerance-adjusted low measurement; determining that the tolerance-adjusted low measurement is less than the alternate middle measurement; retrieving, from a data storage containing a plurality of preselected user preferences for maximum output based on four measurements, a preselected user maximum-output preference for a second tolerance-adjusted high measurement from the first instrument in response to a second alternate middle measurement from the third instrument less than the second tolerance-adjusted high measurement less than a second middle measurement from the second instrument less than a second tolerance-adjusted low measurement from the first instrument; transmitting a minimum output signal to a control system based on the tolerance-adjusted low measurement; and limiting the minimum output of an apparatus with the control system based on the minimum output signal.

According to a twenty-third aspect of the invention, an automated measurement method includes the steps of receiving a tolerance-adjusted low measurement from a first instrument; receiving a tolerance-adjusted high measurement from the first instrument; receiving a middle measurement from a second instrument; receiving an alternate middle measurement from a third instrument; determining that said middle measurement is less than the alternate middle measurement; determining that the alternate middle measurement is less than the tolerance-adjusted high measurement; determining that the tolerance-adjusted high measurement is less than the tolerance-adjusted low measurement; retrieving, from a data storage containing a plurality of preselected user preferences for maximum output based on four measurements, a preselected user maximum-output preference for a second tolerance-adjusted low measurement from the first instrument in response to a second tolerance-adjusted high measurement from the first instrument less than the second tolerance-adjusted low measurement less than a second alternate middle measurement from the third instrument less than a second middle measurement from the second instrument; transmitting a minimum output signal to a control system based on the tolerance-adjusted high measurement; and limiting the minimum output of an apparatus with the control system based on the minimum output signal.

According to a twenty-fourth aspect of the invention, an automated measurement method includes the steps of receiving a tolerance-adjusted low measurement from a first instrument; receiving a tolerance-adjusted high measurement from the first instrument; receiving a middle measurement from a second instrument; receiving an alternate middle measurement from a third instrument; determining that the alternate middle measurement is less than the tolerance-adjusted low measurement; determining that the tolerance-adjusted low measurement is less than the tolerance-adjusted high measurement; determining that the tolerance-adjusted high measurement is less than the middle measurement; retrieving, from a data storage containing a plurality of preselected user preferences for maximum output based on four measurements, a preselected user maximum-output preference for a second tolerance-adjusted low measurement from the first instrument in response to a second middle measurement from the second instrument less than the second tolerance-adjusted low measurement less than a second tolerance-adjusted high measurement from the first instrument less than a second alternate middle measurement from the third instrument; transmitting a minimum output signal to a control system based on the tolerance-adjusted high measurement; and limiting the minimum output of an apparatus with the control system based on the minimum output signal.

According to a twenty-fifth aspect of the invention, an automated measurement method includes the steps of receiving a tolerance-adjusted low measurement from a first instrument; receiving a tolerance-adjusted high measurement from the first instrument; receiving a middle measurement from a second instrument; receiving an alternate middle measurement from a third instrument; determining that the tolerance-adjusted high measurement is less than the tolerance-adjusted low measurement; determining that the tolerance-adjusted low measurement is less than the middle measurement; determining that the middle measurement is less than the alternate middle measurement; retrieving, from a data storage containing a plurality of preselected user preferences for maximum output based on four measurements, a preselected user maximum-output preference for a second alternate middle measurement from the third instrument in response to the second alternate middle measurement less than a second middle measurement from the second instrument less than a second tolerance-adjusted high measurement from the first instrument less than a second tolerance-adjusted low measurement from the first instrument; transmitting a minimum output signal to a control system based on the second alternate middle measurement; and limiting the minimum output of an apparatus with the control system based on the minimum output signal.

BRIEF DESCRIPTION OF DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

FIG. 6 shows an exemplary interface in accordance with various embodiments.

DETAILED DESCRIPTION

Figure 1:
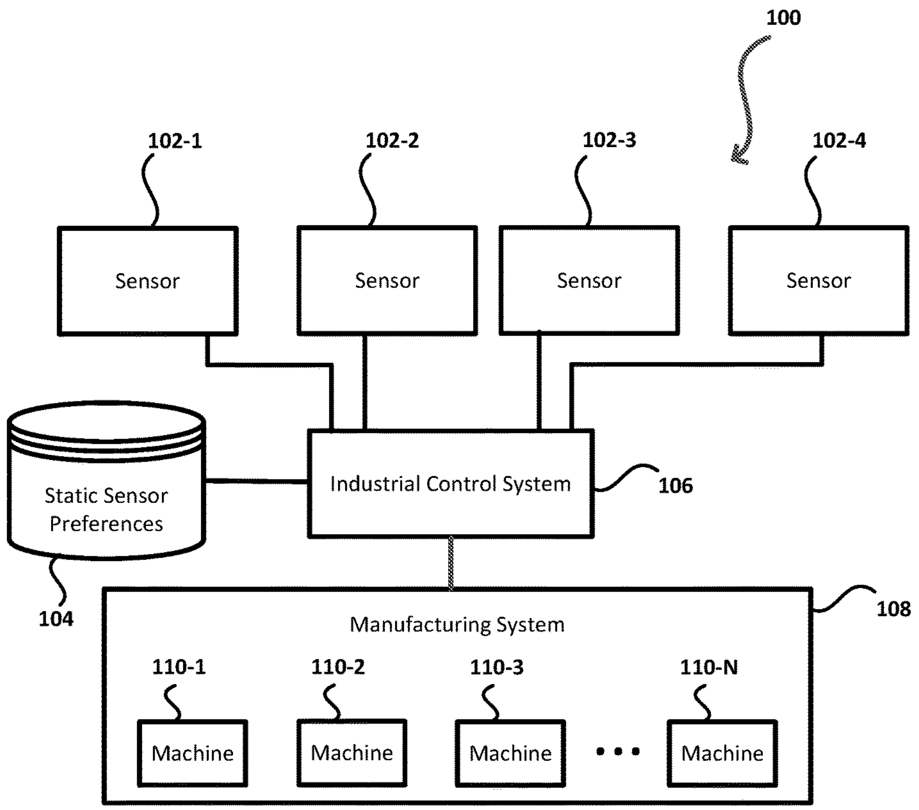
FIG. 1 (Prior Art)
FIG. 1 shows a prior art industrial control system.

So that the manner in which the features and advantages of embodiments of methods and systems of the present invention may be understood in more detail, a more particular description of the present invention briefly summarized above may be had by reference to certain embodiments thereof that are illustrated in the appended drawings, which form a part of this specification. The drawings illustrate only certain embodiments of the present invention and are, therefore, not to be considered limiting of the scope of the present invention which includes other useful and effective embodiments as well. For ease of description and understanding, the following embodiments are discussed mainly in connection with industrial system control applications but can be advantageously implemented in medical applications, financial systems, other algorithmically optimized control systems, and the like.

Algorithmic optimization control software attempts to optimize the operational performance of industrial equipment to meet specified criteria, adjust to new criteria and environmental changes, implement human operator controls, and provide safety in operation. Despite efforts to prevent catastrophic errors, machines do break, power fails, communications are interrupted, and human errors occur. There is a need for control software to provide error detection, error correction, error limitation, and alert signals to human operators to reduce the negative impact of erroneous industrial operations. Error detection processes can take many forms, including error checking, error trapping, "sanity" checks (a/k/a "sanitization"), and the like. Error correction processes may include replacing erroneous signals with correct ones, automatically imposing remediation processes, and the like. Error limitation may include adjusting operational parameters to remain within preset guardrails, adjusting parameters and re-running optimization processes, and the like. Error trapping may involve predicting error conditions and locations, identifying errors, and implementing repairs and other corrections. Sanity checks may include, for example, comparison to order-of-magnitude calculations, comparison to preset guardrails, comparison to operational limits of industrial equipment (e.g., physical weight limits, power consumption limits, heat dissipation limits, and speed limits), guardrail symmetry comparisons, and the like.

System guardrails can serve many different functions. System guardrails may serve to limit the operation of an industrial control process to provide an additional layer of control and safety to the operation of industrial equipment. Guardrails may be imposed to prevent error correction processes that correct a detected error but nevertheless cause additional errors of a different type or even larger magnitude.

Setting system guardrails, however, can be very complex, counterintuitive, time-consuming, and difficult to make consistent. A human operator needs a clear view of what operations may be erroneous, the available range of sufficiently optimal solutions, and the available range of useful guardrails. It is further preferred that the system highlight for the human operator the likely best choices among a range of options for system guardrails. Such a system may alert the human operator when sub-optimal guardrails are chosen.

Embodiments of the present invention preferably can graphically display to the human operator (i) guardrails that do not violate the principle of the independence of irrelevant alternatives, (ii) guardrails that are substantially symmetrical in terms of one or more criteria, (iii) guardrails that are ordered logically, e.g., conservative settings are not more aggressive than aggressive settings and aggressive settings are not more conservative than conservative settings, (iv) multiple levels of potential guardrail adjustment options, and (v) the impact of a human user's selection of sub-optimal guardrails. Embodiments of the error detection/correction system for the algorithmic optimization control software preferably enable the human operator to make informed decisions regarding the adjustment of guardrail settings for the software by displaying the ramifications of different settings.

As new information becomes available, embodiments of the error detection/correction system for algorithmic optimization control software may advantageously facilitate rapid human understanding of the new information (e.g., sensor measurements, third-party data inputs, and the like) and automatically display acceptable ranges of human operator discretion for setting operational system guardrails. The rapid display of such data allows the human operator to react more quickly, efficiently, and accurately. By setting system guardrails in advance, the scope of adjustments that can be made by the algorithmic optimization control software and/or the human operator can be effectively limited. The human operator advantageously can make more nuanced adjustments to system guardrails with an understanding of how those adjustments are, or are not, consistent with existing system guardrails set under simpler or analogous conditions. If necessary, hard prioritization of sensor inputs and other sources of information can be imposed to address foreseeable new information. As well, the error detection/correction system preferably warns the human operator of the consequences of certain guardrail selections if the system guardrails are set in a sub-optimal or otherwise unconventional manner.

Figure 2:
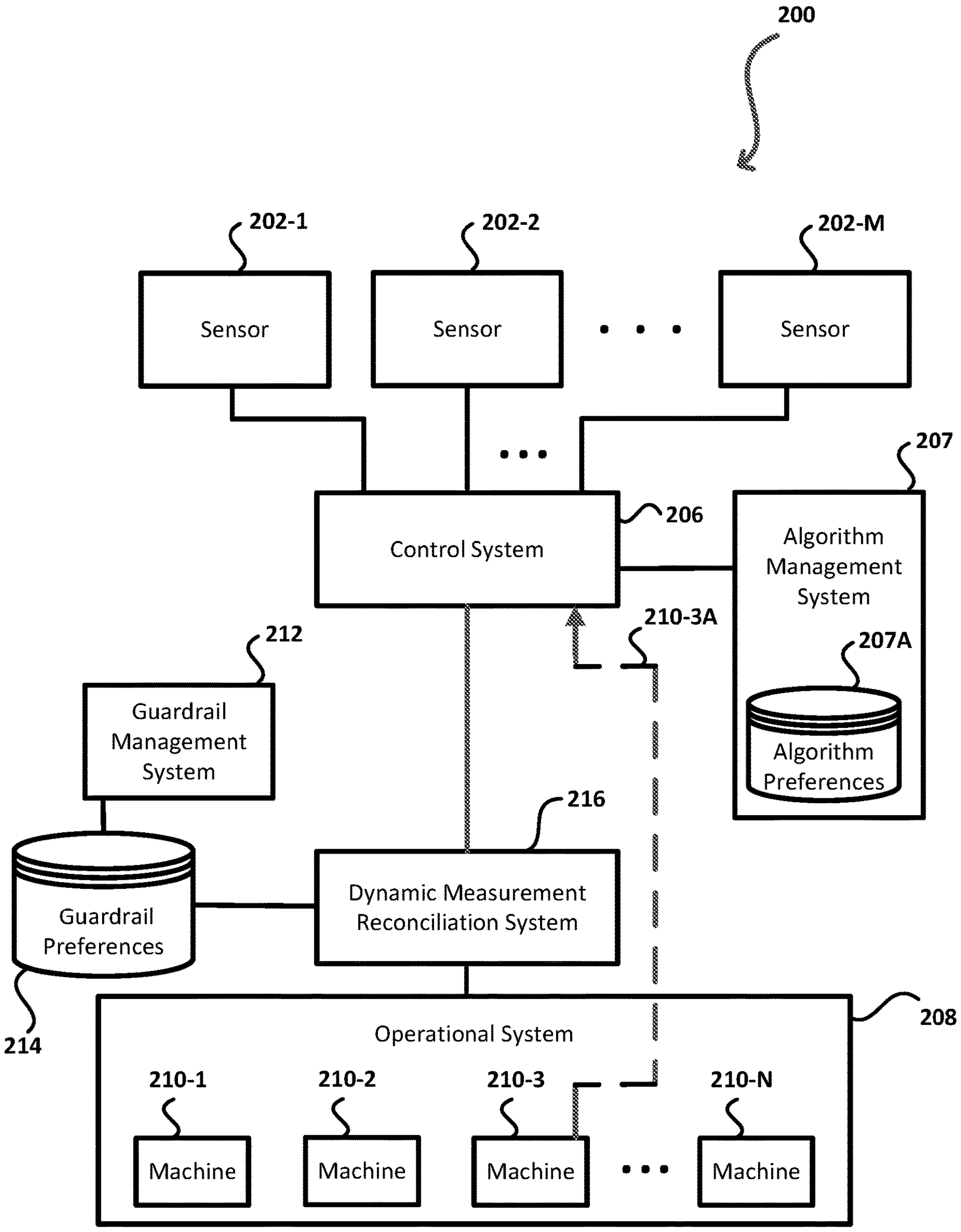
FIG. 2 shows an automated control system in accordance with various embodiments of the present invention.

FIG. 2 shows an automated control system 200 according to an embodiment of the present invention. System 200 comprises sensors 202-1, 202-2, and 202-3 through 202-M (abbreviated as "202-(1-M)"); control system 206; algorithm management system 207 that includes algorithm preferences database 207A; guardrail management system 212; guardrail preferences database 214; dynamic measurement reconciliation system 216; and operational system 208 which includes machines 210-1, 210-2, and 210-3 through 210-N (abbreviated as "210-(1-N)"). Sensors 202-(1-M) provide conventional measurement data to control system 206. Such measurement data may include temperature, flowrate, weight, quantity, price, voltage, and the like. Importantly, sensors 202-(1-M) all measure the same particular type of phenomenon, e.g., all of the sensors measure the temperature of a body, the speed of a vehicle, the weight of an object, the price of a security, or the voltage of a circuit. Preferably, there are four sensors and M=4 and alternatively, it is preferred that there are five sensors and M=5. Nevertheless, M may be any number greater than 3 to maximize the benefits provided by the present invention.

Algorithm management system 207 provides operational algorithms to control system 206, optionally depending on input from a human user via a user interface (not shown), from an external sensor or collection of sensors (not shown), a combination of the foregoing, an automated process, and/or the like. Preferably, system 207 retrieves an operational algorithm stored in algorithm preferences database 207A where one or more operational algorithms are stored. The stored operational algorithms may be conventional operational algorithms, or customized operational algorithms provided by a user, to output control signals for operational system 208 based on the input signals provided by sensors 202-(1-M). For example, the operational algorithm may output the optimal steering angle for a vehicle traveling along a highway based on the inputs from speed sensors 202-(1-M) attached to wheels of the vehicle, utilizing GPS signals, utilizing cellular telephone location data, detecting wind speed, and the like. As another example, the operational algorithm may determine the dosage of medicine to administer to a patient based on the inputs from heart monitoring sensors 202-(1-M) attached to the patient. As a further example, the operational algorithm may determine the amount(s) of reactant(s) to introduce into a chemical reaction chamber based on the inputs from temperature sensors 202-(1-M) detecting the temperature of different areas of the reaction chamber, the temperature of the reaction products, the temperature of an exhaust stream or the like. Optionally, algorithm management system 207 is omitted and control system 206 includes a conventional operational algorithm.

Control system 206 implements the operational algorithm provided by algorithm management system 207 to control operational system 208 based upon the measurement data provided by sensors 202-(1-M). Such control may extend to the control of one or more of individual machines 210-1, 210-2, and 210-3 through 210-N. Optionally, operational system 208 includes only one machine 210-1, only two machines 210-1 and 210-2, or only three machines 210-1, 210-2, and 210-3. In an alternate embodiment, operational system 208 includes four or more machines and N is any number greater than 3. Control system 206 transmits control signals for operational system 208 to dynamic reconciliation measurement system 216.

Guardrail management system 212 is a user interface for receiving user preferences regarding control system limits (also known as "guardrails"), accessing prestored guardrails in the form of static and/or dynamic control system limits stored in guardrail preferences database 214, and displaying received and/or stored guardrails to one or more human operators. Guardrail management system 212 is connected to database 214 which is also connected to dynamic measurement reconciliation system 216. A user may input specific guardrails into system 212 or select from a set of prestored guardrails from database 214. Preferably, guardrail management system 216 includes a graphic user interface suitable for displaying color-coded guardrails that alert a user to guardrails that are consistent or inconsistent with stored guardrails in database 214. System 212 compares a user-selected guardrail with prestored guardrails to determine whether the selection is consistent or inconsistent and display the selection with a corresponding color. System 212 preferably highlights consistent guardrail options to assist a user in intentionally selecting a guardrail that is consistent or inconsistent with prestored guardrails.

Dynamic measurement reconciliation system 216 is connected to control system 206, database 214, and operational system 208. The guardrails stored in database 214 are utilized by dynamic measurement reconciliation system 216 to prevent the operational algorithm of control system 206 from engaging in activity that violates any applicable guardrails. Optionally, such guardrails may also be used by system 216 to prevent a human operator from adjusting operational parameters for operational system 208 that violate an applicable guardrail. In an alternate embodiment, dynamic measurement reconciliation system 216 is connected to guardrail management system 212 instead of, or in addition to, database 214.

For example, a guardrail stored in database 214 may comprise an instruction to calculate the average of the values provided by sensors 202-(1-M) and utilize a value no larger than that average value. As another example, a guardrail stored in database 214 may comprise an instruction to select the second highest (or lowest) value among the values provided by sensors 202-(1-M) and utilize a value no smaller than that value. As a further example, a guardrail stored in database 214 may comprise an instruction to select the value provided by sensor 202-2 if it is the highest value among the values provided by sensors 202-(1-M).

Operational system 208 is an electronically-controlled industrial system or piece of industrial equipment, a medical device, a reaction chamber, a complex machine, an electronic trading system, or the like. Preferably, operational system 208 comprises individually controllable machines 210-(1-N). Each of machines 210-(1-N) may be itself an an electronically-controlled industrial system or piece of industrial equipment, a medical device, a reaction chamber, a complex machine, an electronic trading system, or the like. For example, system 208 may be the steering system for a vehicle (to steer two or four wheels of the vehicle) that utilizes control signals derived from vehicle speed sensors.

In a preferred operation in connection with an industrial application, sensors 202-(1-M) may detect, for example, the temperature inside a reactor, the salinity of a solution, the flowrate of a liquid, the voltage of a circuit, the spot market price of an input material, the speed of a vehicle, or the like. Sensor readings from sensors 202-(1-M) are transmitted to control system 206. Algorithm management system 207 retrieves a control algorithm from algorithm storage 207A and supplies that control algorithm to control system 206. The selection of the control algorithm to retrieve may be performed automatically based on inputs from external sensors (not shown) or from inputs provided by a user via a user interface (not shown). Based on the sensor readings and the control algorithm provided by algorithm management system 207, control system 206 develops a set of control signals for operational system 208 and transmits them to dynamic reconciliation management system 216.

Guardrail management system 212 displays to a user potential and actual guardrail settings for operational system 208 or for individual machines therein. The user selects particular guardrails and the selected guardrails are transmitted to database 214 for storage. Database 214 stores the guardrails in a manner accessible to dynamic reconciliation management system 216. In this way, a user may set guardrail preferences for system 216 via guardrail management system 214.

System 216 compares the set of control signals received from control system 206 to the guardrails stored in database 214 and produces modified control signals. For example, a control signal recognized as likely to cause operational system 208 to exceed its temperature limit may be limited by a guardrail set at the maximum operational temperature of system 208. Instead of the control signals provided by system 206, system 216 would supply to operational system 208 a modified control signal limited to produce the maximum operational temperature of system 208. Alternatively, the guardrail may be set at a temperature 10% below the maximum operational temperature of system 208 to allow an operational margin of safety for system 208. In that case, instead of the control signals provided by system 206, system 216 would supply to operational system 208 a modified control signal limited to produce a temperature 10% below the maximum operational temperature of system 208. As a further alternative, the guardrail would be set at a temperature 5% above the maximum operational temperature of system 208 for a defined duration of time to permit emergency operation of system 208 and system 216 would supply system 208 with a correspondingly adjusted control signal. As a still further alternative, the guardrail would be set at a temperature no more than 5% below the maximum operational temperature of system 208 for a defined duration of time to permit peak operation of system 208. Again, system 216 would supply system 208 with a correspondingly adjusted control signal.

Preferably, the guardrails stored in database 214 define operational processes and limits in the event of the addition or removal of additional sensors 202-(1-M). For example, in the case of operational system 208 comprising the steering system of a vehicle it is foreseeable that satellite tracking data, e.g., GPS signals, used to determine vehicle speed may be intermittent depending on the location of the vehicle and the local topography which may interfere with certain satellite signals. If sensors 202-1, 202-2, 202-3, and 202-4 are wheel speed sensors that output the wheel speed, sensor 202-5 may comprise the intermittent GPS-derived speed. A corresponding guardrail stored in database 214 may comprise the instruction to utilize the speed values detected with sensor 202-5 to create control signals for system 208. As an alternative example, the guardrail may comprise utilizing the speed values detected with sensor 202-5 to create control signals for system 208 if those speed values are larger than or equal to the speed values supplied by sensors 202-1, 202-2, 202-3, and 202-4. If, however, sensor 202-5 does not provide speed values, a guardrail stored in database 214 may, for example, require that the control signal be created using the second highest of the speed values provided by sensors 202-1, 202-2, 202-3, and 202-4. In each case, instead of the control signals provided by system 206, system 216 would supply to operational system 208 a modified control signal based on the sensor preferences mandated by the guardrails stored in database 214.

Guardrails stored in database 214 may thus provide nuanced control of system 208 to address unusual and inconsistent sensor data provided by sensors 202-(1-M) regarding similar, if not identical, measurements. For example, different speed sensors for a vehicle may have different levels of accuracy, precision, and reliability due to their inherent limitations and/or due to external factors that affect their operations. Instantaneous speed sensors on the wheels of a vehicle may detect different speeds because of a difference in the tire pressure of each wheel resulting in a different circumference per wheel. When the vehicle traverses a turn, the inside wheels will necessarily turn less than the outside wheels so that the vehicle speed detected by speed sensors on the inside wheels will be less than the speed detected by speed sensors on the outside wheels. Moreover, those instantaneous speed values provided by the wheel sensors may differ significantly from the speed calculated utilizing GPS location signals. Such GPS location signals inherently have a limited resolution resulting in a confidence interval around each speed calculation. A GPS speed calculation may further be impacted by the direction of travel of the vehicle relative to the GPS satellites requiring an even larger confidence interval around such speed calculations.

Similarly, speed calculations based on terrestrial cellular towers will necessarily have a confidence interval due to the size of the cellular footprint for each tower, the signal strength precision available, and the level of signal interference between the cellular device and the cell tower antenna. A vehicle traveling from one edge of a cellular tower transmission area to another may erroneously be sensed as having a speed equal to that of a vehicle traveling from merely the center of the transmission area to the edge.

System 216 transmits the modified control signals to operational system 208. In turn, system 208 utilizes the modified control signals to control the operation of one or more of machines 210-(1-N). In an alternate embodiment, system 216 transmits the modified control parameters directly to one or more of machines 210-(1-N) to control the operation of the machine(s).

In an alternate embodiment, the guardrails stored in database 214 are conditional based on external data provided by external sources—i.e., not from sensors 202-(1-M). For example, in the case of operational system 208 comprising the steering system of a vehicle, the instantaneous speed sensors 202-1, 202-2, 202-3, and 202-4 may be particularly sensitive to ambient temperature. A guardrail stored in database 214 may be triggered by the detection of a particular temperature and impose a corrective measure to address the temperature-induced "drift" in speed measurements. The corrective measure may be the deliberate omission of data from a particular sensor deemed unreliable at the detected temperature, the addition of a corrective offset amount to the measurement data provided by a particular sensor, a corrective aggregation of sensor data from different sensors and/or at different times to address the temperature-induced "drift," or the like. Alternatively, for example, the guardrail stored in database 214 may require that upon detection of a particular temperature, only the second highest (or lowest) speed measurement provided by instantaneous speed sensors 202-1, 202-2, 202-3, and 202-4 be utilized by the control system algorithm. In this way, degrees of operational control can be imposed via guardrails, e.g., normal, aggressive, conservative, and the like.

In another alternate embodiment, machine 210-3 has a direct connection 210-3A with control system 206. In operation, machine 210-3 transmits to control system 206 status information regarding its operational status and/or a request for particular control signals. In this way, machine 210-3 may receive different control signals than the rest of machines 210-(1-N). Alternatively, a feedback loop between machine 210-3 and control system 206 is formed. For example, in an industrial application, machine 210-3 may require a different temperature than the other machines 210-(1-N) and provide temperature information directly to control system 206 to produce appropriately modified control signals. A human patient may require different temperatures and/or oxygen amounts in different parts of the body. A temperature/oxygen regulator (210-3) attached to one part of the body may signal control system 206 to provide additional heat/oxygen via that regulator.

FIG. 2 is also useful to illustrate an automated algorithmic trading management system 200 according to another embodiment of the present invention. System 200 comprises price data sensors 202-1, 202-2, and 202-3 through 202-M (which may be abbreviated as "202-(1-M)") that constitute price data feeds; algorithmic pricing data control system 206; algorithm management system 207 that includes algorithm preferences database 207A, pricing guardrail management system 212; database 214 of pricing guardrail preferences; dynamic price data reconciliation system 216 (that preferably incorporates a price data streaming system); and price data distribution system 208 which includes machines 210-1, 210-2, and 210-3 through 210-N (abbreviated as "210-(1-N)").

Price data feeds 202-(1-M) are conventional price data feeds to provide price data to dynamic price data reconciliation system 206. Each price data feed may be provided by a price data source, e.g., an exchange, a dealer, a potential transaction counterparty, or the like. In an alternate embodiment, price data feeds 202-(1-M) are conventional price data feeds provided by (a) the same conventional price data source, (b) multiple conventional price data sources, (c) a combination or function of conventional price data from multiple price data sources, or the like, to provide price data to dynamic price data reconciliation system 206. Preferably, there are four price data feeds and M=4 and alternatively, it is preferred that there are five price data feeds and M=5. Nevertheless, M may be any number greater than 3 to maximize the benefits provided by the present invention. In a further embodiment, M=3 and there are only three price data feeds.

Such price data may include offering prices at which sellers will sell (a/k/a "ask"), bidding prices at which buyers will buy (a/k/a "bid"), an average price, a median price, a mid-market price, and the like. Alternatively, price data may include additional information such as quantity-dependent price data or the corresponding quantity data—e.g., to form "the stack." The price data may be provided by a "price aggregator" such as, for example, Bloomberg financial services, Tradeweb, or Refinitiv. Price data sources, like other measuring devices, are often inconsistent with each other, can be entirely inaccurate, can be influenced by extraneous circumstances, may incorrectly reflect values changing rapidly over time, are subject to interruptions, and the like.

Preferably, system 207 retrieves an operational algorithm stored in algorithm preferences database 207A where one or more operational algorithms are stored. The stored operational algorithms may be conventional operational algorithms, or customized operational algorithms provided by a user, to output control signals for operational system 208 based on the input signals provided by sensors 202-(1-M). In a preferred embodiment, database 207A provides a control algorithm in the form of a linear formula based on the input prices provided by one or more of price data feeds 202-(1-M) to create an output of a particular price, price range, price limit, or the like in response to such inputs. Alternatively, the control algorithm takes the form of a lookup table based on the input prices.

Database 207A preferably contains algorithm preferences that include (a) price data feed preferences, (b) price data preferences, and/or (c) price data processing preferences utilizing prestored or default values for transactional costs, opportunity costs, and the like. The transactional costs may be actual costs or predicted costs or, alternatively, the costs of "unwinding" a trade in the future based on the current trade, or the like. Further algorithms stored in database 207A may include, for example, (i) algorithms for determining hedging costs and inventory costs related to different stocks, bonds, options, commodities, and the like; (ii) algorithms for determining the bid-ask price spread to be applied to particular trading scenarios, costs, and/or risks; (iii) algorithms for determining the bid-ask price spread to be applied relative to the size of a requested price quotation (or proposed trade); (iv) algorithms for prioritizing price data from different price feeds (or ranges of prices supplied by price feeds); and the like. In a preferred embodiment of the algorithm stored in database 207A and supplied by algorithm management system 207 to control system 206, the selection of price data from a particular price feed 202 to output depends on the relationship (from lowest price to highest price) among the available price feeds at a particular time—e.g., the time at which a price will be streamed and/or quoted.

Algorithmic pricing data control system 206 implements operational bid/ask pricing algorithms supplied by algorithm management system 207 based upon the pricing data provided by price data feeds 202-(1-M). System 206 calculates prices to be transmitted, displayed, or otherwise output via price data distribution system 208.

Price data distribution system 208 may comprise individual machines 210-(1-N), a network of such machines, a central server computer, a cloud server, one or more display devices, one or more personal communication devices, personal computers, a printer, a graphic display device, and the like. Preferably, machines 210-(1-N) comprise screens, displays, and user interfaces where price data is made available to a user to view. Machines 210-(1-N) may comprise a personal computer, a mainframe computer, a client-server computer system, a tablet computer, a handheld computing device or the like. Alternatively, system 208 may comprise a conventional request for quotation system through which users request and receive price quotations such as those provided for government bond price quotations by Tradeweb, Bloomberg, and the like.

In a further embodiment of the invention, price data distribution system 208 comprises a price streaming system by which, for example, live price data is simultaneously, or nearly simultaneously, transmitted to multiple users, displayed at multiple venues, or the like. Preferably, system 208 continuously streams prices provided by algorithmic pricing data control system 206 for multiple securities, in predetermined amounts, to predetermined screens and/or trading venues. In such an embodiment, control system 206 may generate different prices for a particular security for each or for one or more of machines 210-(1-N) reflecting different preferences or requirements for different users.

Dynamic price data reconciliation system 216 is interposed between control system 206 and price data distribution system 208 and includes a control system that applies specialized price data control in the form of user-directed guardrails to the algorithmic pricing data supplied by control system 206. In a preferred embodiment, system 216 includes an algorithmic optimization software control system to calculate price target values, perform error checking to determine whether guardrails have been reached or would be exceeded, and the like. For example, system 216 preferably compares the set of price data received from control system 206 to the user guardrails stored in database 214 and produces modified price data if the guardrails are violated. For example, price data exceeding the applicable guardrails are limited to the guardrail price or, alternatively, to a different price depending on the guardrail.

A user may set guardrails for system 216 via guardrail management system 212 to modify, limit, or otherwise control the price data output by control system 206 that is supplied via system 216 to price data distribution system 208. System 216 transmits the modified price data to price data distribution system 208.

Price guardrail management system 212 is connected to, and supplies guardrails to, database 214. Dynamic price data reconciliation system 216 accesses guardrails in database 214 in response to the control signals and/or price data provided by control system 206. Price guardrail management system 212 displays static and dynamic guardrail price data, price data ranges, and the like to a user. Via a user interface in system 212, a user can select particular guardrails and the selected guardrails are transmitted to database 214 for storage. Database 214 stores the guardrail in a manner accessible to dynamic price data reconciliation system 216. Preferably, database 214 functions as a look up table of guardrails indexed by price data and/or other control signals supplied by control system 206.

In an alternate embodiment, machine 210-3 has a direct connection 210-3A with control system 206. In operation, machine 210-3 transmits to control system 206 a request for quotation that control system 206 responds to individually by determining specific price data for machine 210-3. Optionally, control system 206 will send the specific price data for machine 210-3 to reconciliation system 216 along with an instruction to apply a different guardrail from guardrail database 214. System 216 applies the specialized guardrail to the requested price data quotation, modifies the price data quotation if required to comply with the guardrail, and passes the resulting price data to machine 210-3.

Figure 3:
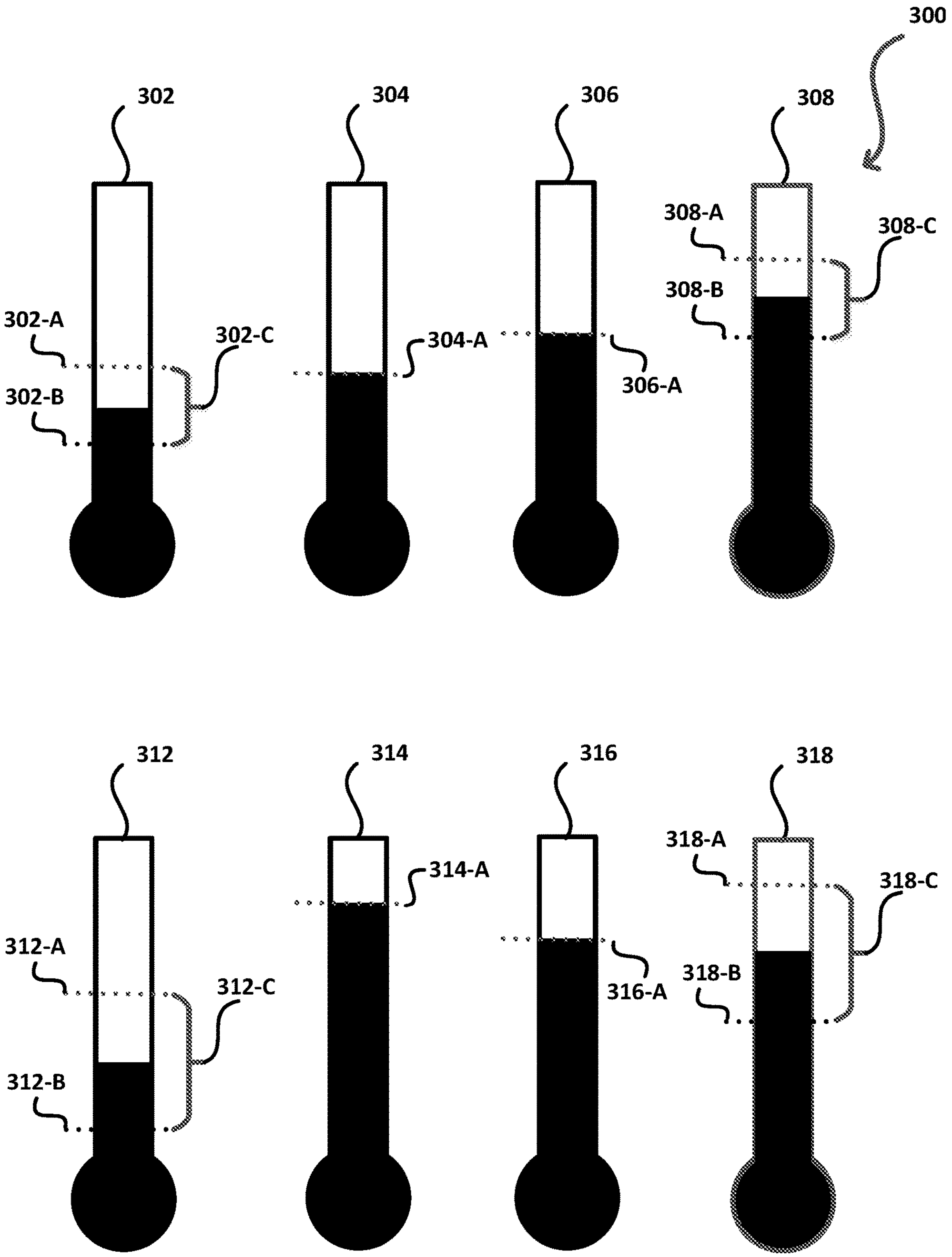
FIG. 3 shows an exemplary method in accordance with various embodiments.

FIG. 3 illustrates measurement data variations among a collection 300 of different sensors of the same measured quality. Eight thermometers 302, 304, 306, 308, 312, 314, 316, and 318 are shown for purposes of explanation. Different measurement sensors or meters, such as spedometers, volt meters, weight scales, price detectors, and the like, can be substituted for the thermometers shown as one of ordinary skill in the art will readily appreciate. Faced with different measurements from different meters and different tolerance ranges for each meter, a human operator is easily confused by the addition and removal of measurement data from different meters. Such confusion frequently manifests as an unintentional violation of the independence of irrelevant alternatives axiom.

As shown, meter 302 senses temperature in a tolerance range 302-C that spans from a high of temperature 302-A to a low of temperature 302-B. While the temperature measurement returned by meter 302 is specifically at the midpoint in tolerance range 302-C or at temperature 302-A or at temperature 302-B at the midpoint in tolerance range 302-C, the actual temperature may be anywhere within that range. Meter 304 detects temperature 304-A which is slightly below temperature 302-A. Meter 308 senses temperature in a tolerance range 308-C that spans from a high of temperature 308-A to a low of temperature 308-B. While the temperature measurement returned by meter 308 is at the midpoint in tolerance range 308-C, the actual temperature may be anywhere within that range. Meter 306 detects temperature 306-A which is slightly above temperature 308-B and significantly above temperature 304-A. Temperature range 302-C is below temperature range 308-C.

As also shown, meter 312 senses temperature in a tolerance range 312-C that spans from a high of temperature 312-A to a low of temperature 312-B. While the temperature measurement returned by meter 312 is specifically at the midpoint in tolerance range 312-C or at temperature 312-A or at temperature 312-B, the actual temperature may be anywhere within that range. Meter 314 detects temperature 314-A which is significantly above temperature 312-A. Meter 318 senses temperature in a tolerance range 318-C that spans from a high of temperature 318-A to a low of temperature 318-B. While the temperature measurement returned by meter 318 is at the midpoint in tolerance range 318-C, the actual temperature may be anywhere within that range. Meter 316 detects temperature 316-A which is significantly above temperatures 312-A and 318-B and below temperature 314-A. Temperature range 312-C is less than but overlapping with temperature range 318-C because temperature 318-B is less than temperature 312-A.

In operation, when presented with the temperature measurements of meters 312, 316, and 318, but without a measurement from meter 314, a human may select temperature 312A as a conservative high limit guardrail. Thereafter, the new presentation of temperature measurement 314-A from meter 314 may inspire the human operator to change the conservative high limit guardrail to temperature 316-A. However, such a selection would be a violation of the axiom of the independence of irrelevant alternatives.

Figure 4:
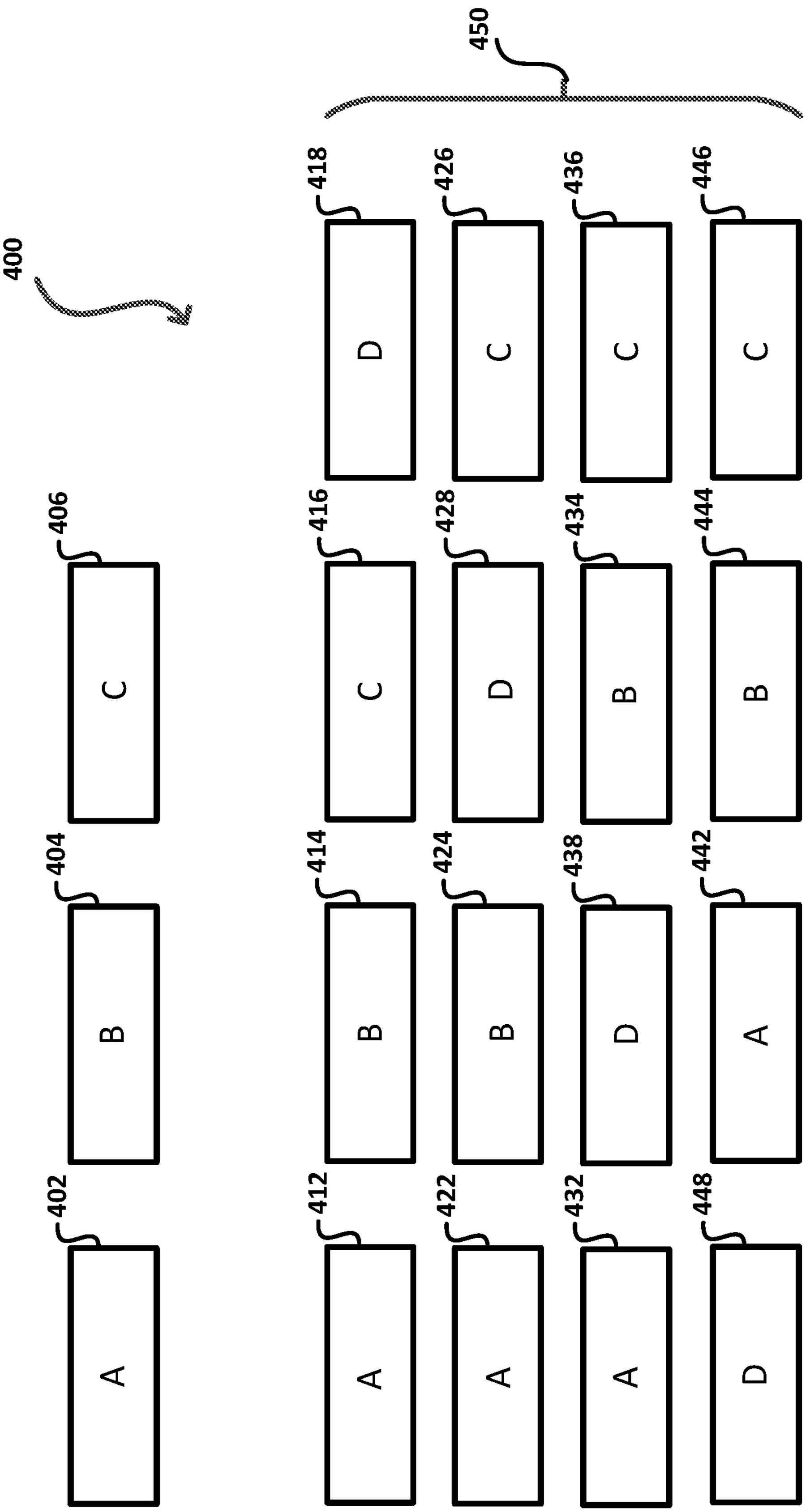
FIG. 4 shows a series of exemplary interfaces in accordance with various embodiments.

FIG. 4 illustrates sensor array permutations 400 when sensors A, B, and C are joined by sensor D to provide input to a control system, e.g., control system 206, and a guardrail application system, e.g., dynamic measurement reconciliation system 216. In an initial operational state, the guardrail application system is configured to receive and process measurement data from three sensors: sensor A 402, sensor B 404, and sensor C 406 where the measurement value from sensor A 402 is less than or equal to the measurement value from sensor B 404 which is less than or equal to the measurement value from sensor C 406. The introduction of measurement data from sensor D can occur in four different ways collectively shown at group 450:

(1) the measurement value from sensor A 412 is less than or equal to the measurement value from sensor B 414 which is less than or equal to the measurement value from sensor C 416 which is less than or equal to the measurement value from sensor D 418;

(2) the measurement value from sensor A 422 is less than or equal to the measurement value from sensor B 424 which is less than or equal to the measurement value from sensor D 428 which is less than or equal to the measurement value from sensor C 426;

(3) the measurement value from sensor A 432 is less than or equal to the measurement value from sensor D 438 which is less than or equal to the measurement value from sensor B 434 which is less than or equal to the measurement value from sensor C 436; and (4) the measurement value from sensor D 448 is less than or equal to the measurement value from sensor A 442 which is less than or equal to the measurement value from sensor B 444 which is less than or equal to the measurement value from sensor C 446.

Depending on the circumstances, the presence of the new measurement data from sensor D can be startling, incongruous, or otherwise difficult to assimilate. Too quick decisions by a human user can lead to errors in setting guardrails in response to the sudden appearance of measurement data from sensor D among the different permutations available with respect to the measurement data from sensors A, B, and C. In an alternative embodiment, one or more of sensors A, B, C, and D may output measurement value ranges instead of merely measurement values. The potential for human error being introduced into the guardrail-setting process as illustrated in connection with FIG. 4 increases as more sensors are added.

Figure 5:
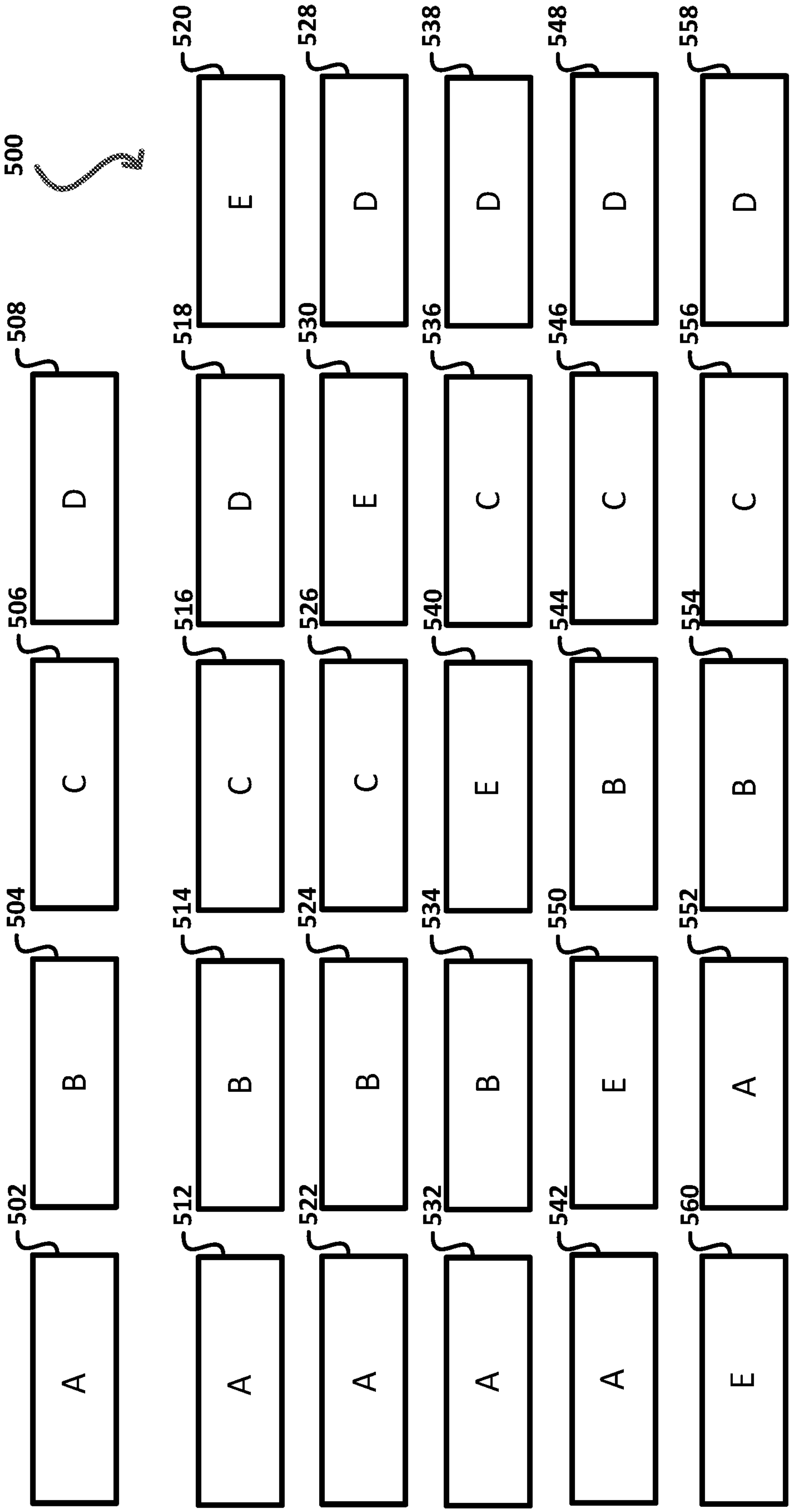
FIG. 5 shows a series of exemplary interfaces in accordance with various embodiments.

FIG. 5 illustrates sensor array permutations 500 when sensors A, B, C and D are joined by sensor E to provide input to a control system, e.g., control system 206, and a guardrail application system, e.g., dynamic measurement reconciliation system 216. In an initial operational state, the guardrail application system is configured to receive and process measurement data from three sensors: sensor A 502, sensor B 504, sensor C 506, and sensor D 508 where the measurement value from sensor A 502 is less than or equal to the measurement value from sensor B 504 which is less than or equal to the measurement value from sensor C 506 which is less than or equal to the measurement value from sensor D 506. The introduction of measurement data from sensor E can occur in five different ways:

(1) the measurement value from sensor A 512 is less than or equal to the measurement value from sensor B 514 which is less than or equal to the measurement value from sensor C 516 which is less than or equal to the measurement value from sensor D 518 which is less than or equal to the measurement value from sensor E 520;

(2) the measurement value from sensor A 522 is less than or equal to the measurement value from sensor B 524 which is less than or equal to the measurement value from sensor C 526 which is less than or equal to the measurement value from sensor E 530 which is less than or equal to the measurement value from sensor D 528;

(3) the measurement value from sensor A 532 is less than or equal to the measurement value from sensor B 534 which is less than or equal to the measurement value from sensor E 540 which is less than or equal to the measurement value from sensor C 536 which is less than or equal to the measurement value from sensor D 538;

(4) the measurement value from sensor A 542 is less than or equal to the measurement value from sensor E 550 which is less than or equal to the measurement value from sensor B 544 which is less than or equal to the measurement value from sensor C 546 which is less than or equal to the measurement value from sensor D 548; and (5) the measurement value from sensor E 560 is less than or equal to the measurement value from sensor A 552 which is less than or equal to the measurement value from sensor B 554 which is less than or equal to the measurement value from sensor C 556 which is less than or equal to the measurement value from sensor D 558.

Depending on the circumstances, the presence of the new measurement data from sensor E can be startling, incongruous, or otherwise difficult to assimilate. Too quick decisions by a human user can lead to errors in setting guardrails in response to the sudden appearance of measurement data from sensor E among the different permutations available with respect to the measurement data from sensors A, B, C, and D. In an alternative embodiment, one or more of sensors A, B, C, D, and E may output measurement value ranges instead of merely measurement values. The potential for human error being introduced into the guardrail-setting process as illustrated in connection with FIG. 5 increases as still more sensors are added.

FIG. 6 illustrates sensor array permutations 600 when sensors A, B and C are joined by sensors D and E to provide input to a control system, e.g., control system 206, and a guardrail application system, e.g., dynamic measurement reconciliation system 216. An initial sensor array set 602 of three sensors A, B, and C is provided. Sensor array permutation set 604 corresponds to the permutations shown in FIG. 5 wherein values from the sensors measurement values from the sensors are ordered A<=B<=C<=D. Sensor array permutation set 606 corresponds to the permutations shown in FIG. 5 wherein values from the sensors measurement values from the sensors are ordered A<=B<=D<=C. Sensor array permutation set 608 corresponds to the permutations shown in FIG. 5 wherein values from the sensors measurement values from the sensors are ordered A<=D<=B<=C. Sensor array permutation set 610 corresponds to the permutations shown in FIG. 5 wherein values from the sensors measurement values from the sensors are ordered D<=A<=B<=C. Thus, the potential for human error being introduced into a guardrail-setting process increases dramatically as the different permutations of potential sensor measurements changes and a human user will be quickly overwhelmed by the number of permutations.

As one of ordinary skill in the art will readily appreciate, the number of permutations of sensor data ordering is based on a factorial relationship. A three-sensor array has 3!=6 permutations of sensor values. A four-sensor array has 4!=24 permutations of sensor values. A five-sensor array has 5!=120 permutations of sensor values. As the number of permutations increases, the opportunity for human error in adjusting values to be inconsistent with each other increases.

Figure 7:
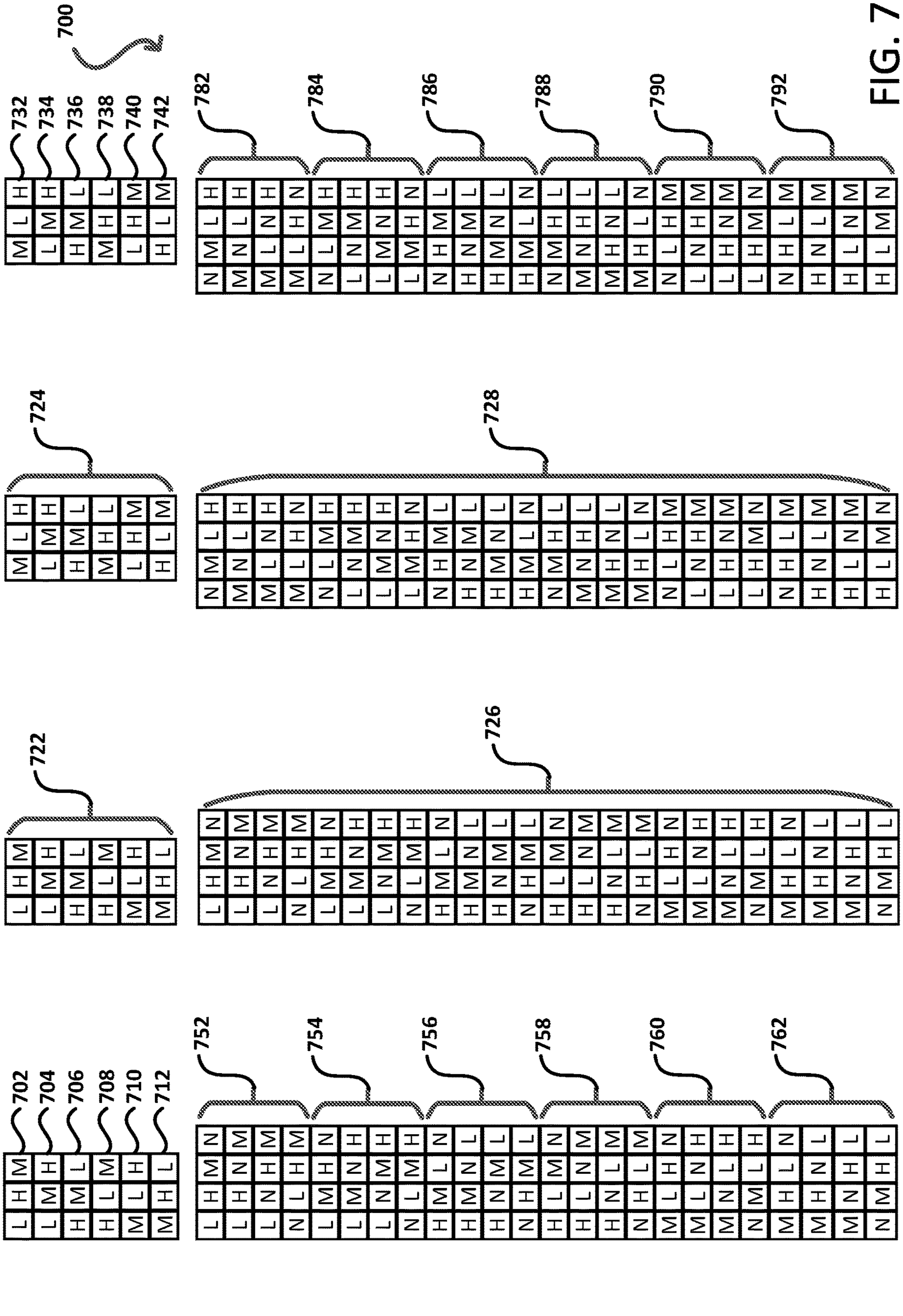
FIG. 7 shows an exemplary interface in accordance with various embodiments.

FIG. 7 illustrates a display 700 for a human operator according to an embodiment of the present invention. Each of the boxes L, M, N, and H refers to a measurement device or different measurements from a particular measurement device or set of devices, e.g., sensors 202-1, 202-2, . . . 202-M. Preferably, "L" refers to a measurement device that provides a relatively lower measurement, "H" refers to a measurement device that provides a relatively higher measurement, "M" refers to a measurement device that provides a middle (or mean) measurement, and "N" refers to a second measurement device that provides a second middle (or mean) measurement. More preferably, "L" refers to a measurement device that provides a relatively lower measurement and "H" refers to the same measurement device that concurrently provides a relatively higher measurement, for example, obtained using a different measurement technique or criteria.

Optionally, each measurement device has a tolerance range for each measurement value it provides. It is then preferred that "L" refers to a measurement device that provides the highest tolerance-adjusted value of a relatively lower measurement and "H" refers to the same measurement device that concurrently provides the lowest tolerance-adjusted value of a relatively higher measurement. One of ordinary skill in the art will appreciate that the L value could be higher than the H value due to the effect of the tolerance adjustments, e.g., as shown in FIG. 3 where measurement 312A is higher than measurement 318B.

Each of display lines 702, 704, 706, 708, 710, 712, 732, 734, 736, 738, 740, and 742, as well as each of the display lines in display line groups 722 and 724, display permutations of measurement values (or measurement value ranges) from (or derived from) measurement devices L, M, and H where measurement values increase from left to right in the display line. Each display line is thus analogous to the depiction of devices A, B, and C in FIG. 4 at blocks 402, 404, and 406, respectively.

Moreover, for each display line, there is a corresponding ordered display line group that appears below it in display 700 to incorporate measurement data from measurement device N (analogous to group 450 incorporating measurement data from device D). Display line group 752 corresponds to display line 702. Display line group 754 corresponds to display line 704. Display line group 756 corresponds to display line 706. Display line group 758 corresponds to display line 708. Display line group 760 corresponds to display line 710. Display line group 762 corresponds to display line 712.

Similarly, display line group 782 corresponds to display line 732. Display line group 784 corresponds to display line 734. Display line group 786 corresponds to display line 736. Display line group 788 corresponds to display line 738. Display line group 790 corresponds to display line 740. Display line group 792 corresponds to display line 742. The same pattern of corresponding relationships exists between the set of display lines 722 and the set of display line groups 726 and between the set of display lines 724 and the set of display line groups 728.

Viewing display 700 as a whole, it should be noted that the left two columns are identical and the right two columns are identical but that the left and right columns are quasi-mirror images of each other. Preferably, in all four columns the permutations are shown in increasing order from left to right. From left to right, the middle measurement values, M and N, are mirrored and the high and low values, H and L, are mirrored and inverted. This quasi-mirroring allows for an accurate display of guardrails in circumstances that comprise logical opposites but which confuse a human operator into making inconsistent selections.

In certain embodiments, a user's selection of a box L, M, N, or H refers to the respective value provided by the corresponding measurement device. In a preferred embodiment, however, the user's selection of a box L, M, N, or H refers instead to a range of values including the respective value provided by the corresponding measurement device. If the respective value is the lowest among the measurement values provided by the measurement devices (i.e., the corresponding box is on the left in the ordered set of measurement values), the range extends from negative infinity, absolute zero, zero, or a preset minimum number, to the next highest value provided by the measurement devices (i.e., the value provided by the measurement device corresponding to the box immediately to the right of the selected box). If the respective value is the highest among the measurement values provided by the measurement devices (i.e., the corresponding box is on the right in the ordered set of measurement values), the range extends from the next lowest value provided by the measurement devices (i.e., the value provided by the measurement device corresponding to the box immediately to the left of the selected box) to infinity or to a preset maximum number. If the respective value is between values provided by the other measurement devices (i.e., the corresponding box is between other boxes in the ordered set of measurement values), the range extends from the next lowest value provided by the measurement devices (i.e., the value provided by the measurement device corresponding to the box immediately to the left of the selected box) to the next highest value provided by the measurement devices (i.e., the value provided by the measurement device corresponding to the box immediately to the right of the selected box).

In each of the above-described embodiments, reference to a range may be inclusive or exclusive of the end points of that range. In fact, it is preferred that each range not include the endpoint values, e.g., where M falls between L and H, the selection of M corresponds to the selection of the range of values between L and H, not including L and H: $L<M<H$.

In operation, display 700 provides for both a quick guide as to what perfectly symmetric settings would be for the guardrails, as well as a way to impose and highlight any overrides to perfect symmetry in the guardrails. As discussed above, situations exist when there is strong justification for enforcing symmetry of guardrails. For instance, in a system where the (i) output is the steering angle of a vehicle's steering wheel, (ii) the sensors on the four wheels measure speed, and (iii) an additional sensor reports on overall vehicle speed on the basis of a global positioning satellite signal, the guardrail that stops the steering angle from exceeding a particular angle toward the left should be mirrored to stop the steering angle from exceeding a particular angle toward the right. By contrast, for a vehicle that races on a track in only one direction and only ever turns left, the application of slightly different guardrails for the left and right may be appropriate. This may be especially true for a track having a solid barrier around its perimeter where too much angle to the right could result in crashing into that barrier. As another example, for an industrial system that regulates the temperature of a low-pressure gas, it could be that the increase in pressure caused by heating the gas is a more dangerous threat than the potential liquification caused by cooling the gas by the same amount such that guardrails for controlling the heating system for the gas should be purposely asymmetric.

Figure 8:
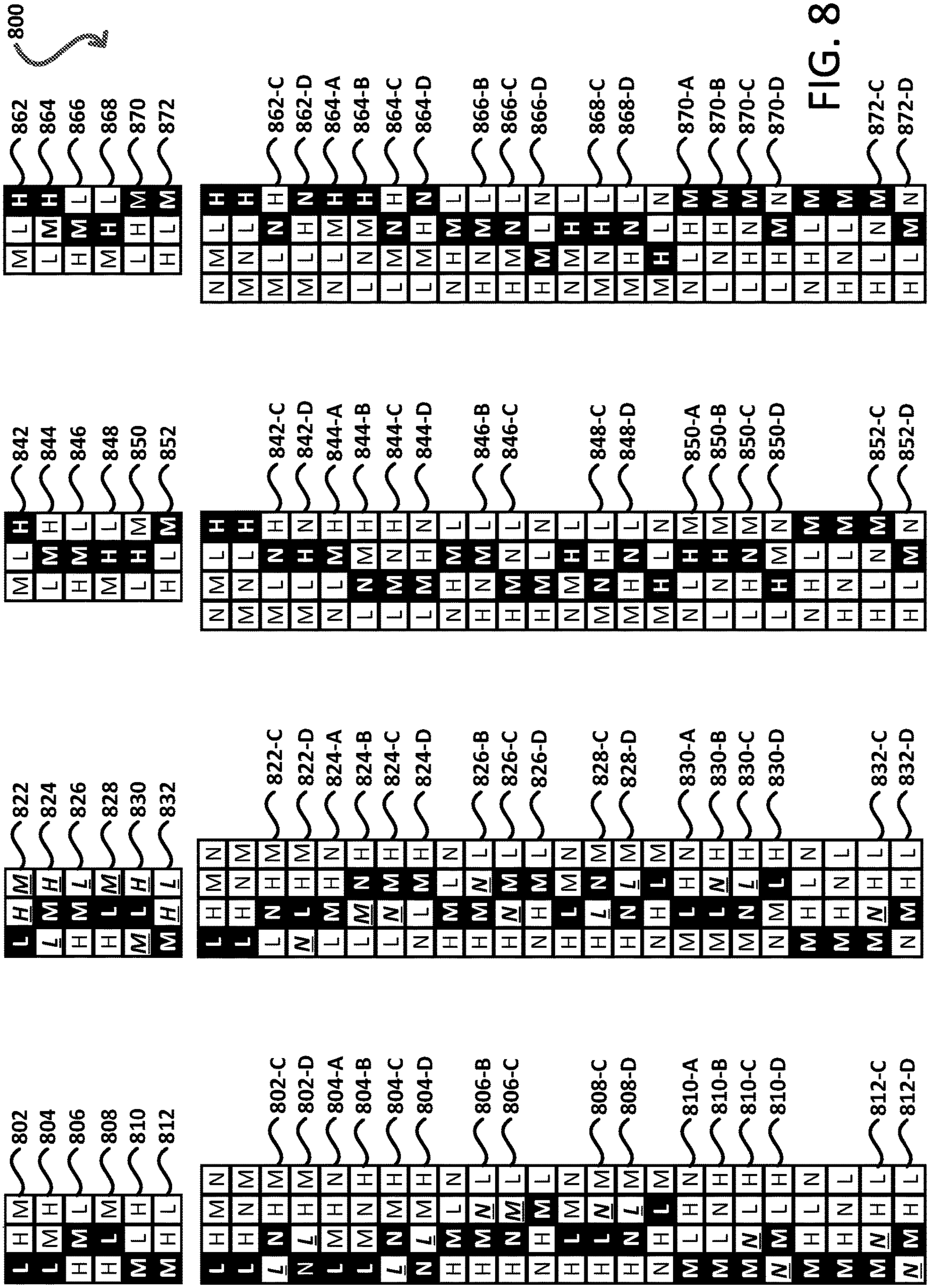
FIG. 8 shows an exemplary interface in accordance with various embodiments.

FIG. 8 illustrates a display 800 for a human operator according to another embodiment of the present invention. Display 800 has the same arrangement of permutations of boxes L, M, N, and H as display 700. In display 800, however, a user has made selections of certain boxes L, M, N, and H which the system of the present invention has propagated through to other boxes to provide logical consistency and to highlight alternative logically consistent selections in related permutations. In addition, the left pair of columns are distinguished in that the left-most column displays one set of user selections while the second column from the left displays more "aggressive" selections. Similarly, the right-most column displays a set of user selections, preferably consistent with those of the left-most column, while the second column from the right displays more "aggressive" selections. "Aggressive" in this context preferably means "less likely or equally likely to become a binding constraint" in that the "Aggressive" guardrail selection (on the inner left side or the inner right side of a row in display 800) is less likely to be triggered as a guardrail than the standard guardrail selection on the same side of that same row, or equally likely to be triggered.

The right-most column displays user selections that, in the context of pursuing the converse objective with guardrails, are logically consistent with the selections in the left-most column on a row-by-row basis for each permutation. If a low guardrail is used to avoid a critically high output the converse is using a high guardrail to avoid a critically low output. Similarly, having relatively large tolerance for high outputs despite trying to avoid a critically high output is the converse of having relatively large tolerance for low outputs despite trying to avoid a critically low output. As a matter of logical symmetry, the output from a device providing a middle (or mean) value that constitutes a sufficient guardrail for a given objective will also be sufficient as a guardrail for the converse objective. For example, (a) the user's selection of guardrail L in permutations 802 and 804 correspond to the user's converse selection of guardrail H in permutations 862 and 864, respectively; (b) the user's selection of guardrail M in permutation 806 corresponds to the user's symmetric selection of guardrail M in permutation 866; (c) the user's selection of guardrail L in permutation 808 corresponds to the user's converse selection of guardrail H in permutation 868; and (d) the user's selection of guardrail M in permutations 810 and 812 correspond to the user's symmetric selection of guardrail M in permutations 870 and 872, respectively.

The features described above with respect to the outer pair of columns of guardrail permutations apply in the same manner to the inner pair of columns of guardrail permutations. For example, (a) the user's selection of guardrail L in permutation 822 corresponds to the user's converse selection of guardrail H in permutation 842; (b) the user's selection of guardrail M in permutations 824 and 826 correspond to the user's symmetric selection of guardrail M in permutations 844 and 846, respectively; (c) the user's selection of guardrail L in permutations 828 and 830 correspond to the user's converse selection of guardrail H in permutations 848 and 850, respectively; and (d) the user's selection of guardrail M in permutation 832 corresponds to the user's symmetric selection of guardrail M in permutation 852.

The "standard" pair of guardrail settings (outer two columns) and the "aggressive" pair of guardrail settings (inner two columns) embody two operational strategies whereby the operator chooses between using more careful guardrails overall (e.g., standard guardrails) versus using less restrictive guardrails (e.g., aggressive guardrails). In a preferred embodiment, moving from the set of 802, 804, 806, 808, 810 and 812 guardrails (standard) to the respectively corresponding 822, 824, 826, 828, 830, and 832 guardrails (aggressive), the aggressive guardrail in a given row is not less than (i.e., is greater-than-or-equal-to) the corresponding standard guardrail in that row. Further, in a preferred embodiment, moving from the set of 862, 864, 866, 868, 870 and 872 guardrails (standard) to the respectively corresponding 842, 844, 846, 848, 850, and 852 guardrails (aggressive), the aggressive guardrail in a given row is not greater than (i.e., is less-than-or-equal-to) the corresponding standard guardrail in that row. The foregoing arrangement reflects that on a row-by-row basis in display 800, the aggressive guardrails are either (i) equally likely to become "binding constraints" or (ii) less likely to become "binding constraints" as the standard guardrails.

For each six (6) row set of permutations of three guardrails in a column, a corresponding twenty-four (24) row set of permutations of four guardrails appears below it in the same column in display 800. The difference between each row 8_xy_ and its corresponding rows 8_xy_-A, 8_xy_-B, 8_xy_-C, and 8_xy_-D (where "x" and "y" are each integers) is the introduction of a new guardrail N in each of the four different relative positions in that row. For example, in row 804, L<=M<=H while in corresponding row 804-A, L<=M<=H<=N; in corresponding row 804-B, L<=M<=N<=H; in corresponding row 804-C, L<=N<=M<=H; and in corresponding row 804-D, N<=L<=M<=H. Similarly, in row 850, L<=H<=M while in corresponding row 850-A, L<=H<=M<=N; in corresponding row 850-B, L<=H<=N<=M; in corresponding row 850-C, L<=N<=H<=M; and in corresponding row 850-D, N<=L<=H<=M.

In each column in display 800, the selection of a guardrail in each row 8_xy_ is shown in reverse print (white text on black background) and reflected in the automatic highlighting of the guardrails in each of rows 8_xy_-A, 8_xy_-B, 8_xy_-C, and 8_xy_-D that do not violate the principle of independence of irrelevant alternatives in either reverse print (a selected guardrail) or in print that is in bold, italics, and underlined ("BIU print").

In some embodiments, the system displays in reverse print a prestored (default) guardrail for each of rows 8_xy_-A, 8_xy_-B, 8_xy_-C, and 8_xy_-D that does not violate the principle of independence of irrelevant alternatives based on the user's selection of guardrails in each row 8_xy_. Other guardrails that also do not violate the principle of independence of irrelevant alternatives based on the user's selection of guardrails in each row 8_xy_ are displayed with BIU print.

In some other embodiments, the system displays in BIU print all guardrails in each of rows 8_xy_-A, 8_xy_-B, 8_xy_-C, and 8_xy_-D that do not violate the principle of independence of irrelevant alternatives based on the user's selection of guardrails in each row 8_xy_. The user then reviews the available guardrail options for each row and, if a guardrail displayed with BIU print is selected, the system changes the display of that guardrail to reverse print.

In a preferred alternate embodiment, the two "aggressive" twenty-four (24) row sets of permutations of four guardrails that appear in display 800 are highlighted as the intersection of user selections in the respectively corresponding "standard" twenty-four (24) row set of permutations of four guardrails and the user selections in the respectively corresponding "aggressive" set of permutations of three guardrails. For example, the user has selected the L guardrail in row 822 (aggressive) and the N guardrail in row 802-C (standard) which the system intersects to identify the N guardrail in row 822-C as the only guardrail in that row which (a) does not violate the principle of independence of irrelevant alternatives and (b) is at least as aggressive as the standard guardrail selection. The user has selected that N guardrail and it is displayed in reverse print. By contrast, because the user has selected the L guardrail in row 822 (aggressive) and the N guardrail in row 802-D (standard), the system intersects them to identify both the N and L guardrails in row 822-D as the only guardrails in that row which (a) do not violate the principle of independence of irrelevant alternatives and (b) are at least as aggressive as the standard guardrail selection. As shown in display 800, the user has selected the L guardrail in row 822-D and it is displayed in reverse print while the N guardrail in that row is displayed in BIU print.

As a further example, the user has selected the M guardrail in row 824 (aggressive) and the L guardrail in row 804-A (standard) which the system intersects to identify the M guardrail in row 824-A as the only guardrail in that row which (a) does not violate the principle of independence of irrelevant alternatives and (b) is at least as aggressive as the standard guardrail selection. The user has selected that M guardrail and it is displayed in reverse print. By contrast, because the user has selected the M guardrail in row 824 (aggressive) and the L guardrail in row 804-B (standard), the system intersects them to identify both the M and N guardrails in row 824-B as the only guardrails in that row which (a) do not violate the principle of independence of irrelevant alternatives and (b) are at least as aggressive as the standard guardrail selection. As shown in display 800, the user has selected the N guardrail in row 824-B and it is displayed in reverse print while the M guardrail in that row is displayed in BIU print. In further contrast, because the user has selected the M guardrail in row 824 (aggressive) and the N guardrail in row 804-C (standard), the system intersects them to identify both the N and M guardrails in row 824-C as the only guardrails in that row which (a) do not violate the principle of independence of irrelevant alternatives and (b) are at least as aggressive as the standard guardrail selection. As shown in display 800, the user has selected the M guardrail in row 824-C and it is displayed in reverse print while the N guardrail in that row is displayed in BIU print. Similarly, because the user has selected the M guardrail in row 824 (aggressive) and the N guardrail in row 804-D (standard), the system intersects them to identify the M guardrail in row 824-D as the only guardrail in that row which (a) does not violate the principle of independence of irrelevant alternatives and (b) is at least as aggressive as the standard guardrail selection. As shown in display 800, the user has selected the M guardrail in row 824-D and it is displayed in reverse print.

Demonstrating the same principles further, in display 800 the user has selected the M guardrail in row 826 (aggressive) and the M guardrail in row 806-B (standard) which the system intersects to identify both the M and N guardrails in row 826-B as the only guardrails in that row which (a) do not violate the principle of independence of irrelevant alternatives and (b) are at least as aggressive as the standard guardrail selection. The user has selected that M guardrail in row 826-B and it is displayed in reverse print while the N guardrail in that row is displayed in BIU print. By contrast, because the user has selected the M guardrail in row 826 (aggressive) and the N guardrail in row 806-C (standard), the system intersects them to identify both the N and M guardrails in row 826-C as the only guardrails in that row which (a) do not violate the principle of independence of irrelevant alternatives and (b) are at least as aggressive as the standard guardrail selection. As shown in display 800, the user has selected the M guardrail in row 826-C and it is displayed in reverse print while the N guardrail in that row is displayed in BIU print.

It is also shown in display 800 that because the user has selected the L guardrail in row 828 (aggressive) and the L guardrail in row 808-C (standard), the system intersects them to identify both the L and N guardrails in row 828-C as the only guardrails in that row which (a) do not violate the principle of independence of irrelevant alternatives and (b) are at least as aggressive as the standard guardrail selection. As shown in display 800, the user has selected the N guardrail in row 828-C and it is displayed in reverse print while the L guardrail in that row is displayed in BIU print. By contrast, because the user has selected the L guardrail in row 828 (aggressive) and the N guardrail in row 808-D (standard), the system intersects them to identify both the N and L guardrails in row 828-D as the only guardrails in that row which (a) do not violate the principle of independence of irrelevant alternatives and (b) are at least as aggressive as the standard guardrail selection. As shown in display 800, the user has selected the N guardrail in row 828-D and it is displayed in reverse print while the L guardrail in that row is displayed in BIU print.

As an additional example, the user has selected the L guardrail in row 830 (aggressive) and the M guardrail in row 810-A (standard) which the system intersects to identify the L guardrail in row 830-A as the only guardrail in that row which (a) does not violate the principle of independence of irrelevant alternatives and (b) is at least as aggressive as the standard guardrail selection. The user has selected that L guardrail and it is displayed in reverse print. By contrast, because the user has selected the L guardrail in row 830 (aggressive) and the M guardrail in row 810-B (standard), the system intersects them to identify both the L and N guardrails in row 830-B as the only guardrails in that row which (a) do not violate the principle of independence of irrelevant alternatives and (b) are at least as aggressive as the standard guardrail selection. As shown in display 800, the user has selected the L guardrail in row 830-B and it is displayed in reverse print while the N guardrail in that row is displayed in BIU print. In further contrast, because the user has selected the L guardrail in row 830 (aggressive) and the M guardrail in row 810-C (standard), the system intersects them to identify both the N and L guardrails in row 830-C as the only guardrails in that row which (a) do not violate the principle of independence of irrelevant alternatives and (b) are at least as aggressive as the standard guardrail selection. As shown in display 800, the user has selected the N guardrail in row 830-C and it is displayed in reverse print while the L guardrail in that row is displayed in BIU print. Similarly, because the user has selected the L guardrail in row 830 (aggressive) and the M guardrail in row 810-D (standard), the system intersects them to identify the L guardrail in row 830-D as the only guardrail in that row which (a) does not violate the principle of independence of irrelevant alternatives and (b) is at least as aggressive as the standard guardrail selection. As shown in display 800, the user has selected the L guardrail in row 830-D and it is displayed in reverse print.

Display 800 further exemplifies that because the user has selected the M guardrail in row 832 (aggressive) and the M guardrail in row 812-C (standard), the system intersects them to identify both the M and N guardrails in row 832-C as the only guardrails in that row which (a) do not violate the principle of independence of irrelevant alternatives and (b) are at least as aggressive as the standard guardrail selection. As shown in display 800, the user has selected the M guardrail in row 832-C and it is displayed in reverse print while the N guardrail in that row is displayed in BIU print. By contrast, because the user has selected the M guardrail in row 832 (aggressive) and the M guardrail in row 812-D (standard), the system intersects them to identify the M guardrail in row 832-D as the only guardrail in that row which (a) does not violate the principle of independence of irrelevant alternatives and (b) is at least as aggressive as the standard guardrail selection. As shown in display 800, the user has selected the M guardrail in row 832-D and it is displayed in reverse print.

Viewing the permutations of boxes L, H, M, and N in the lower 80% of display 800, (a) the user's selection of guardrail N in permutations 802-C, 802-D, 804-C, 804-D, 806-C, and 808-D correspond to the symmetric selection of guardrail N in permutations 862-C, 862-D, 864-C, 864-D, 866-C, and 868-D respectively; (b) the user's selection of guardrail L in permutations 804-A, 804-B, and 808-C correspond to the converse selection of guardrail H in permutations 864-A, 864-B, and 868-C, respectively; and (c) the user's selection of guardrail M in permutations 806-B, 810-A, 810-B, 810-C, 810-D, 812-C, and 812-D correspond to the symmetric selection of guardrail M in permutations 866-B, 870-A, 870-B, 870-C, 870-D, 872-C, and 872-D, respectively. Similarly, for the "aggressive" permutations, (a) the user's selection of guardrail N in permutations 822-C, 824-B, 828-C, 828-D, and 830-D correspond to the symmetric selection of guardrail N in permutations 842-C, 844-B, 848-C, 848-D, and 850-C respectively; (b) the user's selection of guardrail L in permutations 822-D, 830-A, 830-B, and 830-C correspond to the converse selection of guardrail H in permutations 842-D, 850-A, 850-B, and 850-D, respectively; and (c) the user's selection of guardrail M in permutations 824-A, 824-C, 824-D, 826-B, 826-C, 832-C, and 832-D correspond to the symmetric selection of guardrail M in permutations 844-A, 844-C, 844-D, 846-B, 846-C, 852-C, and 852-D, respectively.

Thus, the guardrails that are highlighted and shown selected by the user (in reverse print) on the right half of display 800 reflect the level of converse risk equivalent to that of the respectively corresponding selections on the left half of display 800. Based on the guardrails selected by the user on the left half of display 800, the system of an embodiment of the present invention determines the converse risk equivalent and symmetric risk equivalent guardrails for the right half of display 800 and, as shown in FIG. 8, displays them in reverse print if they are selected by the user. In an alternate embodiment (not shown), those risk equivalent guardrails are displayed on the right half of display 800 in BIU print and, optionally, the display of the guardrail changes to reverse print upon selection by the user.

Figure 9:
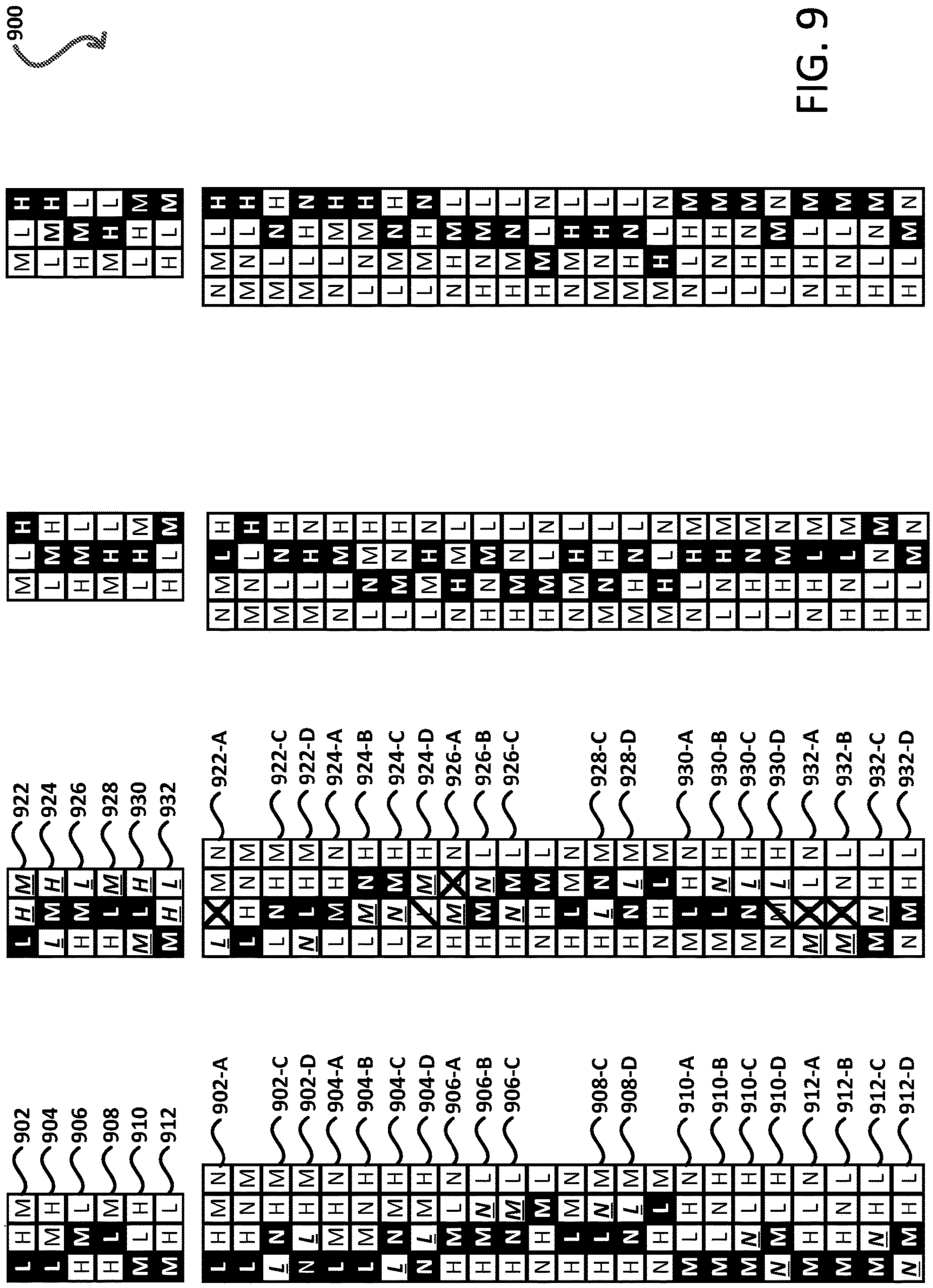
FIG. 9 shows an exemplary interface in accordance with various embodiments.

FIG. 9 illustrates a display 900 for a human operator according to an alternate embodiment of the present invention. In operation, the user can select any guardrail in the aggressive portion of the lower left side of the display and the system highlights that selection as consistent or inconsistent with other guardrails selected by the user and, if inconsistent, whether the selection is too high or too low. Display 900 is identical to display 800 except that the user has made guardrail selections in rows 922-A, 924-D, 926-A, 930-D, 932-A, and 932-B that are inconsistent with other selected guardrails.

As shown in display 900, the user has selected the L guardrail in row 922 (aggressive) and the L guardrail in row 902-A (standard) which the system intersects to identify the L guardrail in row 922-C as the only guardrail in that row which (a) does not violate the principle of independence of irrelevant alternatives and (b) is at least as aggressive as the standard guardrail selection, and displays that guardrail in BIU print. The user, however, has selected the higher H guardrail which the system flags by displaying a large X over the H guardrail in row 922-C, to highlight that is an inconsistent, relatively more-aggressive guardrail selection. By contrast, because the user has selected the M guardrail in row 924 (aggressive) and the N guardrail in row 904-D (standard), the system intersects them to identify the M guardrail in row 924-D as the only guardrail in that row which (a) does not violate the principle of independence of irrelevant alternatives and (b) is at least as aggressive as the standard guardrail selection. However, the user has selected the lower L guardrail which the system flags by displaying a forward slash over the L guardrail in row 924-D, to highlight that is an inconsistent, relatively less-aggressive guardrail selection.

As a further example, the user has selected the M guardrail in row 926 (aggressive) and the M guardrail in row 906-A (standard) which the system intersects to identify the M guardrail in row 926-A as the only guardrail in that row which (a) does not violate the principle of independence of irrelevant alternatives and (b) is at least as aggressive as the standard guardrail selection, and displays that guardrail in BIU print. The user, however, has selected the higher L guardrail which the system flags by displaying a large X over the L guardrail in row 926-A. Similarly, the user has selected the M guardrail in row 932 (aggressive) and the M guardrail in rows 912-A and 912-B (standard) which the system respectively intersects to identify the M guardrails in row 932-A and 932-B as the only guardrails in each respective row which (a) does not violate the principle of independence of irrelevant alternatives and (b) is at least as aggressive as the standard guardrail selection, and displays that guardrail in BIU print. The user, however, has selected the higher H guardrail in both rows which the system flags by displaying a large X over the H guardrail in both row 932-A and 932-B.

As also shown in display 900, the user has selected the L guardrail in row 930 (aggressive) and the M guardrail in row 910-D (standard) which the system intersects to identify the L guardrail in row 930-D as the only guardrail in that row which (a) does not violate the principle of independence of irrelevant alternatives and (b) is at least as aggressive as the standard guardrail selection, and displays that guardrail in BIU print. The user, however, has selected the lower M guardrail which the system flags by displaying a forward slash over the M guardrail in row 930-D.

Figure 10:
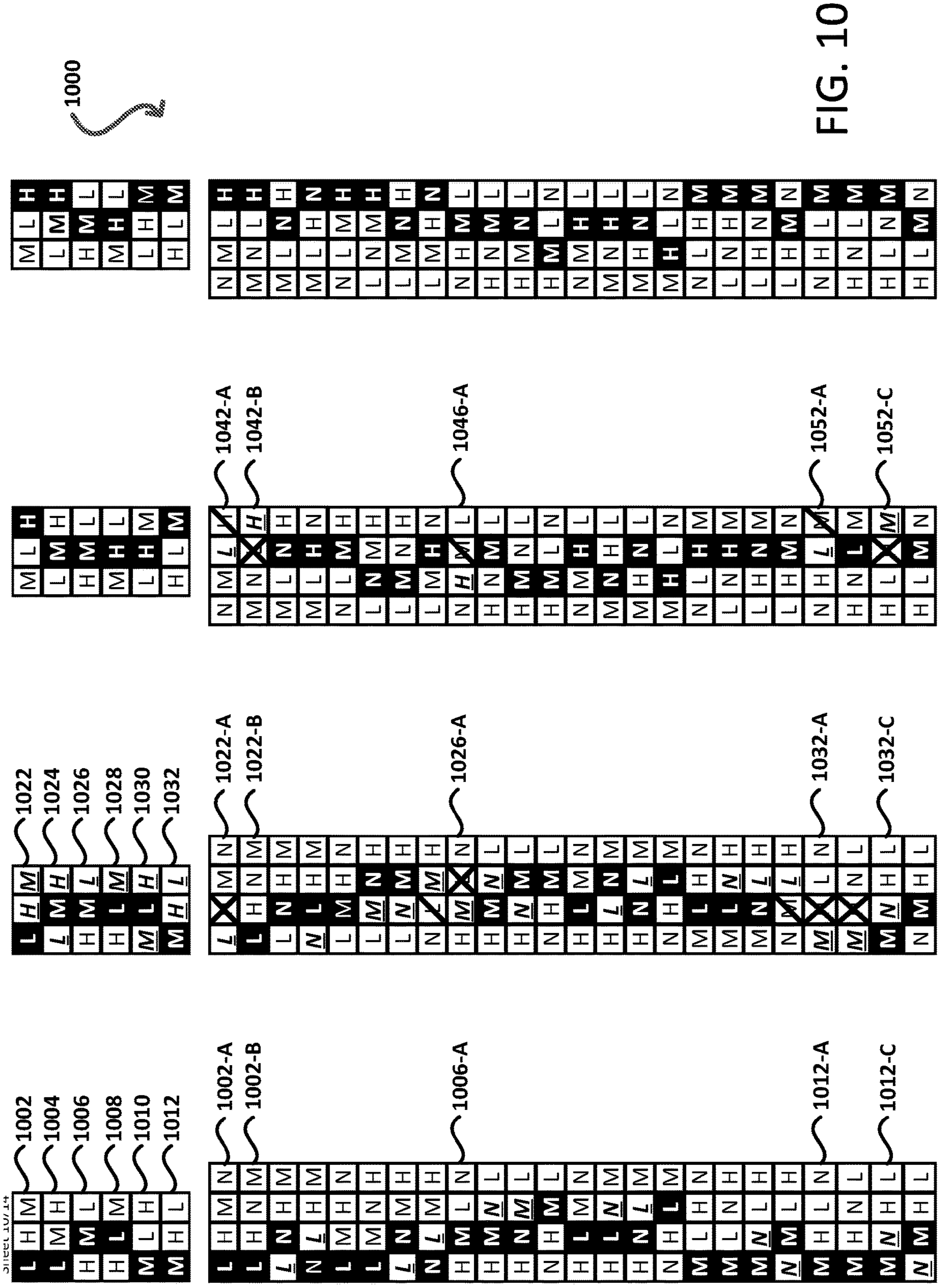
FIG. 10 shows an exemplary interface in accordance with various embodiments.

FIG. 10 illustrates a display 1000 for a human operator according to a further embodiment of the present invention. Display 1000 is identical to display 900 except that the user has made guardrail selections in rows 1042-A, 1042-B, 1046-A, 1052-A, and 1052-C that are inconsistent with other selected guardrails. As shown, the user's selection of guardrail H in permutations 1022-A corresponds to the converse guardrail L in row 1042-A which the system displays in BIU print. The user, however, has selected the higher H guardrail which the system flags by displaying a forward slash over the H guardrail in row 1042-A to highlight that is an inconsistent, relatively less-aggressive guardrail selection. By contrast, the user's selection of guardrail L in row 1022-B corresponds to the converse guardrail H in permutations 1042-B which the system displays in BIU print. The user, however, has selected the lower L guardrail which the system flags by displaying a large X over the L guardrail in row 1042-B to highlight that is an inconsistent, relatively more-aggressive guardrail selection.

The user's selection of guardrail L in row 1026-A corresponds to the converse guardrail H in row 1046-A which the system displays in BIU print. The user, however, has selected the higher M guardrail which the system flags by displaying a forward slash over the M guardrail in row 1046-A to highlight that is an inconsistent, relatively less-aggressive guardrail selection. Similarly, the user's selection of guardrail H in row 1032-A corresponds to the converse guardrail L in row 1052-A which the system displays in BIU print. The user, however, has selected the higher M guardrail which the system flags by displaying a forward slash over the M guardrail in row 1052-A to highlight that is an inconsistent, relatively less-aggressive guardrail selection. By contrast, the user's selection of guardrail M in permutations 1032-C corresponds to the symmetric guardrail M in permutations 1052-C which the system displays in BIU print. The user, however, has selected the lower N guardrail which the system flags by displaying a large X over the N guardrail in row 1052-C to highlight that is an inconsistent, relatively more-aggressive guardrail selection.

Figure 11:
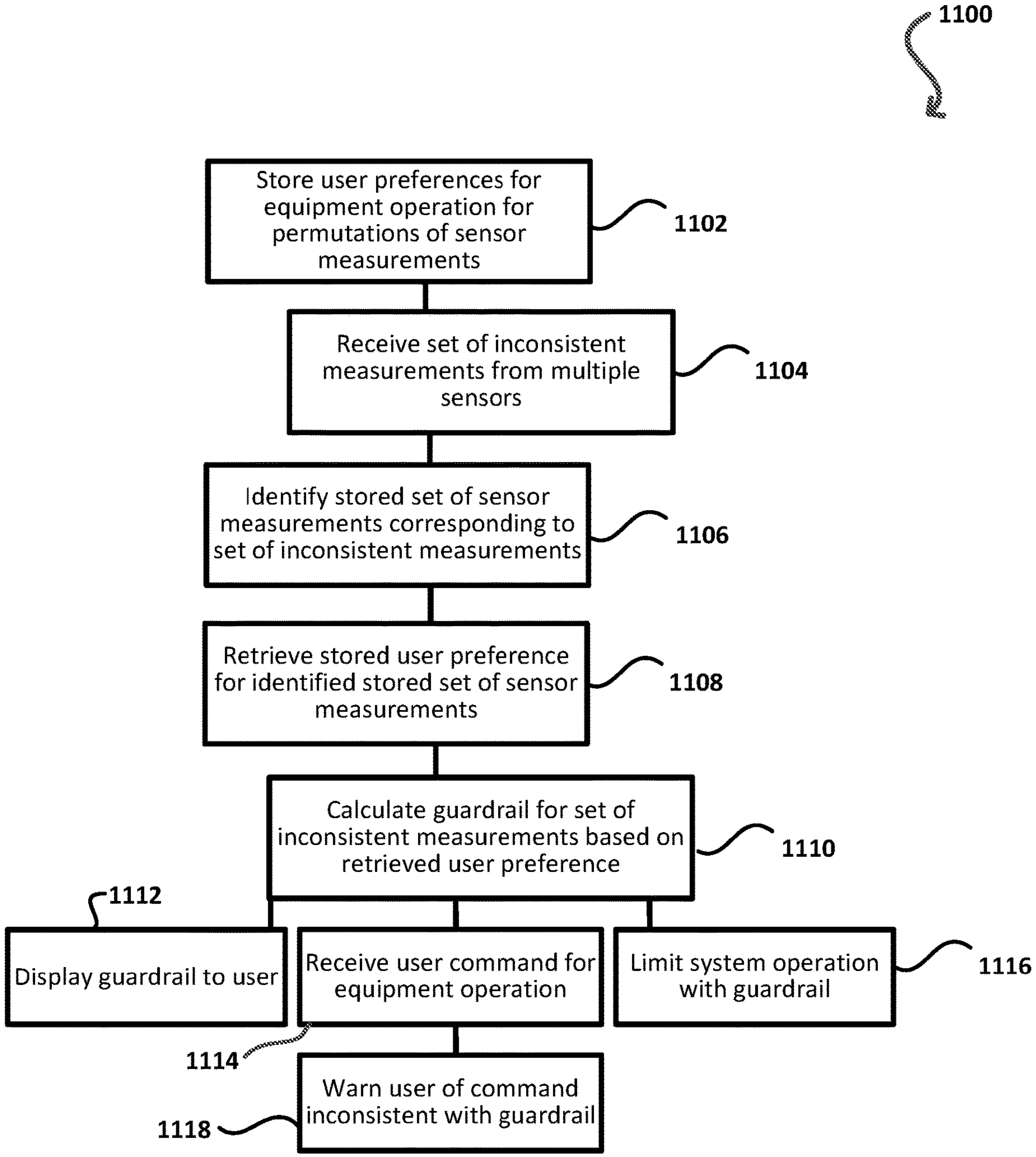
FIG. 11 shows a flowchart of a method in accordance with an embodiment of the invention.

FIG. 11 is a flowchart 1100 of a guardrail management methodology according to an embodiment of the present invention In step 1102, the system stores a set of user preferences, such as operational parameters, for some or all of the potential permutations of ordered sensor measurements input to the system. In the next step 1104, the system receives a set of inconsistent sensor measurement data from the set of sensors. In the next step 1106, the system uses the set of inconsistent sensor measurement data to identify the corresponding stored user preferences for that particular permutation of sensor measurements. In the next step 1108, the system retrieves the corresponding stored user preferences. In the next step 1110, the system calculates, or otherwise determines, a guardrail (or range of guardrails) based on the retrieved user preferences. Following step 1110, one or more of steps 1112, 1114, and 1116 occurs. In step 1112, the calculated guardrail is displayed to a user via a graphic user interface. In step 1116, the system limits operations with the guardrail. In step 1114, the system receives a user command regarding the operation of the system, e.g., a particular system parameter is set by the user. In the next step 1118, the system compares the received user command to the calculated guardrail and warns the user of the inconsistency, e.g., by highlighting the user's command on a graphic display.

Figure 12:
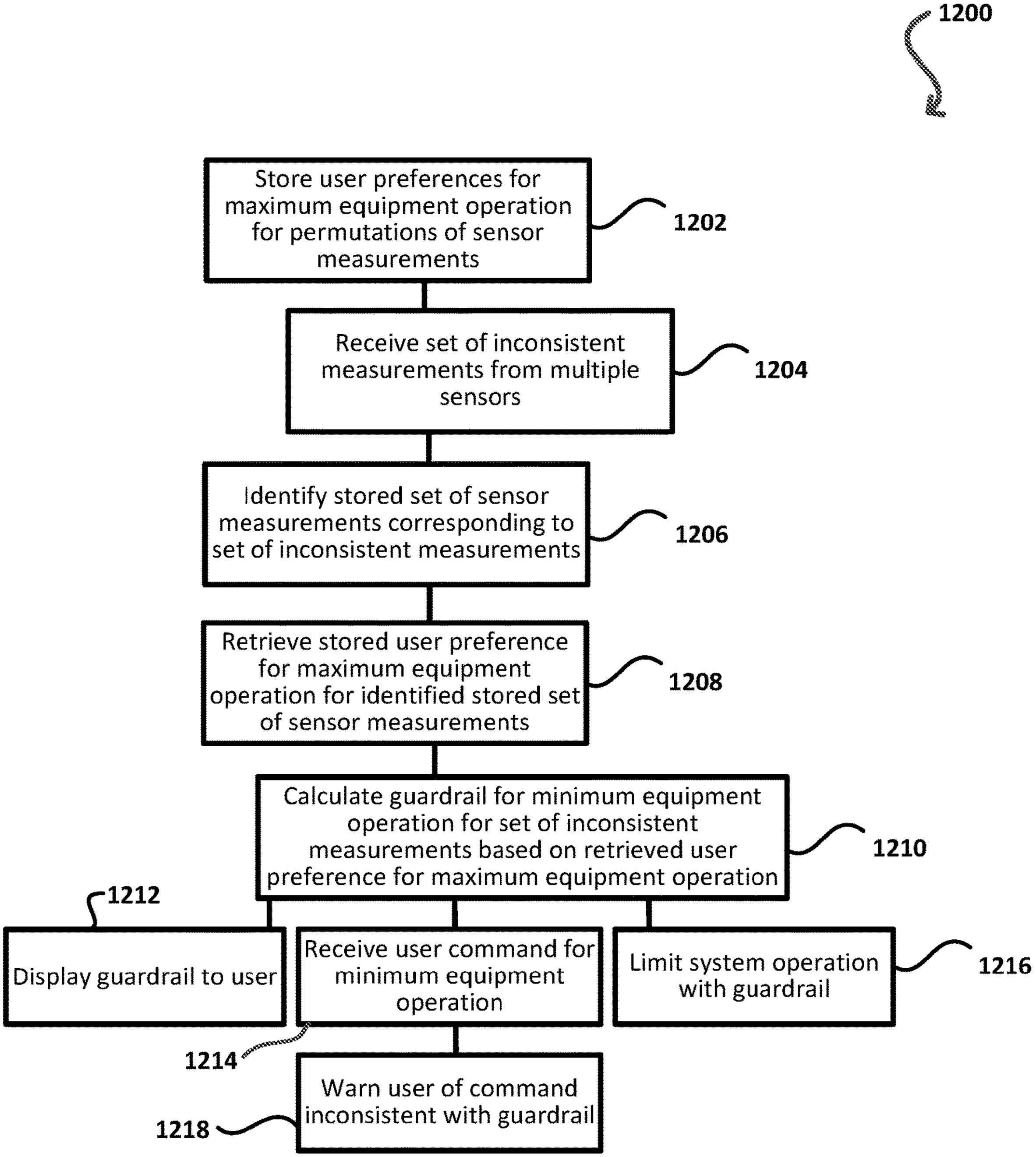
FIG. 12 shows a flowchart of a method in accordance with another embodiment of the invention.

FIG. 12 is a flowchart 1200 of a guardrail management methodology according to another embodiment of the present invention In step 1202, the system stores a set of user preferences, such as operational parameters, corresponding to a maximum, or otherwise non-standard, operation for some or all of the potential permutations of ordered sensor measurements input to the system. In the next step 1204, the system receives a set of inconsistent sensor measurement data from the set of sensors. In the next step 1206, the system uses the set of inconsistent sensor measurement data to identify the corresponding stored user preferences for that particular permutation of sensor measurements. In the next step 1208, the system retrieves the corresponding stored user preferences for maximum (or at least non-standard) system operation. In the next step 1210, the system calculates, or otherwise determines, a guardrail (or range of guardrails) for minimum system operation based on the retrieved user preferences for maximum system operation. Following step 1210, one or more of steps 1212, 1214, and 1216 occurs. In step 1212, the calculated guardrail is displayed to a user via a graphic user interface. In step 1216, the system limits operations with the guardrail. In step 1214, the system receives a user command regarding the operation of the system, e.g., a particular system parameter is set by the user. In the next step 1218, the system compares the received user command to the calculated guardrail and warns the user of the inconsistency, e.g., by highlighting the user's command on a graphic display.

Figure 13:
FIG. 13 shows an exemplary interface in accordance with various embodiments.

FIG. 13 is a display diagram 1300 to which reference will be made in explaining operational algorithms according to methods of the present invention. Display 1300 comprises five columns where each column includes six (6) sub-rows that together include all possible permutations of three (3) ordered measurement readings L, M, and H. Each column includes the same possible permutations of ordered measurement readings as shown in FIG. 7. For purposes of explanation, sub-rows 1302, 1312, 1322, 1332, 1342, and 1352 show six different actual ordered measurement readings, with the same pattern as shown in sub-rows 732, 734, 736, 738, 740, and 742, respectively. Sub-rows 1310, 1320, 1330, 1340, 1350, and 1360 show the same six (6) possible permutations of three (3) ordered measurement readings as shown in sub-rows 732, 734, 736, 738, 740, and 742, respectively. Sub-rows 1308, 1318, 1328, 1338, 1348, and 1358 show the same six (6) possible permutations of three (3) ordered measurement readings as shown in the respective sub-rows of sub-column 724. Sub-rows 1306, 1316, 1326, 1336, 1346, and 1356 show the same six (6) possible permutations of three (3) ordered measurement readings as shown in the respective sub-rows of sub-column 722. Sub-rows 1304, 1314, 1324, 1334, 1344, and 1354 show the same six (6) possible permutations of three (3) ordered measurement readings as shown in sub-rows 702, 704, 706, 708, 710, and 712, respectively.

Referring to display diagram 1300, a system receives three input measurements from three separate sensors L, M, and H and the measurement readings are in the order M<=L<=H as represented by block 1302. The system also receives input that a standard guardrail scenario applies. The system consults a database containing the pre-stored orderings shown in the far-right column of diagram 1300 and identifies the matching ordering shown in sub-row 1310. That ordering is related in the database to the corresponding converse ordering shown in sub-row 1304 where L<=H<=M. A user has pre-selected guardrail L (shown in reverse print) in sub-row 1304 and that selection is stored in the database. The system determines that the corresponding converse guardrail is the H guardrail in sub-row 1310 (also shown in reverse print) and applies that guardrail to the system operation.

In the "aggressive" scenario where the measurement readings are in the order M<=L<=H as represented by block 1302, the system receives input that an "aggressive" guardrail scenario applies and consults a database containing the pre-stored orderings shown in the second-from-the-right column of diagram 1300. The matching ordering shown in sub-row 1308 is identified. That ordering is related in the database to the corresponding converse ordering shown in sub-row 1306 where L<=H<=M. A user has pre-selected guardrail H (shown in reverse print) in sub-row 1306 and that selection is stored in the database. The system determines that the corresponding converse guardrail is the L guardrail in sub-row 1308 (also shown in reverse print) and applies that guardrail to the system operation.

In another embodiment again referring to display diagram 1300, a system receives three input measurements from three separate sensors L, M, and H and the measurement readings are in the order L<=M<=H as represented by block 1312. The system also receives input that a standard guardrail scenario applies. The system consults a database containing the pre-stored orderings shown in the far-right column of diagram 1300 and identifies the matching ordering shown in sub-row 1320. That ordering is related in the database to the corresponding converse ordering shown in sub-row 1314 where L<=M<=H. A user has pre-selected guardrail L (shown in reverse print) in sub-row 1314 and that selection is stored in the database. The system determines that the corresponding converse guardrail is the H guardrail in sub-row 1320 (also shown in reverse print) and applies that guardrail to the system operation.

In the "aggressive" scenario where the measurement readings are in the order L<=M<=H as represented by block 1312, the system receives input that an "aggressive" guardrail scenario applies and consults a database containing the pre-stored orderings shown in the second-from-the-right column of diagram 1300. The matching ordering shown in sub-row 1318 is identified. That ordering is related in the database to the corresponding converse ordering shown in sub-row 1316 where L<=M<=H. A user has pre-selected guardrail M (shown in reverse print) in sub-row 1316 and that selection is stored in the database. The system determines that the corresponding converse guardrail is the M guardrail in sub-row 1318 (also shown in reverse print) and applies that guardrail to the system operation.

In a further embodiment referring to display diagram 1300, a system receives three input measurements from three separate sensors L, M, and H and the measurement readings are in the order H<=M<=L as represented by block 1322. The system also receives input that a standard guardrail scenario applies. The system consults a database containing the pre-stored orderings shown in the far-right column of diagram 1300 and identifies the matching ordering shown in sub-row 1330. That ordering is related in the database to the corresponding converse ordering shown in sub-row 1324 where H<=M<=L. A user has pre-selected guardrail H (shown in reverse print) in sub-row 1324 and that selection is stored in the database. The system determines that the corresponding converse guardrail is the L guardrail in sub-row 1330 (also shown in reverse print) and applies that guardrail to the system operation.

In the "aggressive" scenario where the measurement readings are in the order H<=M<=L as represented by block 1322, the system receives input that an "aggressive" guardrail scenario applies and consults a database containing the pre-stored orderings shown in the second-from-the-right column of diagram 1300. The matching ordering shown in sub-row 1328 is identified. That ordering is related in the database to the corresponding converse ordering shown in sub-row 1326 where H<=M<=L. A user has pre-selected guardrail H (shown in reverse print) in sub-row 1326 and that selection is stored in the database. The system determines that the corresponding converse guardrail is the L guardrail in sub-row 1328 (also shown in reverse print) and applies that guardrail to the system operation.

In an alternate embodiment referring to display diagram 1300, a system receives three input measurements from three separate sensors L, M, and H and the measurement readings are in the order M<=H<=L as represented by block 1332. The system also receives input that a standard guardrail scenario applies. The system consults a database containing the pre-stored orderings shown in the far-right column of diagram 1300 and identifies the matching ordering shown in sub-row 1340. That ordering is related in the database to the corresponding converse ordering shown in sub-row 1334 where H<=L<=M. A user has pre-selected guardrail L (shown in reverse print) in sub-row 1334 and that selection is stored in the database. The system determines that the corresponding converse guardrail is the H guardrail in sub-row 1340 (also shown in reverse print) and applies that guardrail to the system operation.

In the "aggressive" scenario where the measurement readings are in the order M<=H<=L as represented by block 1332, the system receives input that an "aggressive" guardrail scenario applies and consults a database containing the pre-stored orderings shown in the second-from-the-right column of diagram 1300. The matching ordering shown in sub-row 1338 is identified. That ordering is related in the database to the corresponding converse ordering shown in sub-row 1336 where H<=L<=M. A user has pre-selected guardrail L (shown in reverse print) in sub-row 1336 and that selection is stored in the database. The system determines that the corresponding converse guardrail is the H guardrail in sub-row 1338 (also shown in reverse print) and applies that guardrail to the system operation.

In another alternate embodiment referring to display diagram 1300, a system receives three input measurements from three separate sensors L, M, and H and the measurement readings are in the order L<=H<=M as represented by block 1342. The system also receives input that a standard guardrail scenario applies. The system consults a database containing the pre-stored orderings shown in the far-right column of diagram 1300 and identifies the matching ordering shown in sub-row 1350. That ordering is related in the database to the corresponding converse ordering shown in sub-row 1344 where M<=L<=H. A user has pre-selected guardrail L (shown in reverse print) in sub-row 1344 and that selection is stored in the database. The system determines that the corresponding converse guardrail is the H guardrail in sub-row 1350 (also shown in reverse print) and applies that guardrail to the system operation.

In the "aggressive" scenario where the measurement readings are in the order L<=H<=M as represented by block 1342, the system receives input that an "aggressive" guardrail scenario applies and consults a database containing the pre-stored orderings shown in the second-from-the-right column of diagram 1300. The matching ordering shown in sub-row 1348 is identified. That ordering is related in the database to the corresponding converse ordering shown in sub-row 1346 where M<=L<=H. A user has pre-selected guardrail L (shown in reverse print) in sub-row 1346 and that selection is stored in the database. The system determines that the corresponding converse guardrail is the H guardrail in sub-row 1348 (also shown in reverse print) and applies that guardrail to the system operation.

In a further alternate embodiment referring to display diagram 1300, a system receives three input measurements from three separate sensors L, M, and H and the measurement readings are in the order H<=L<=M as represented by block 1352. The system also receives input that a standard guardrail scenario applies. The system consults a database containing the pre-stored orderings shown in the far-right column of diagram 1300 and identifies the matching ordering shown in sub-row 1360. That ordering is related in the database to the corresponding converse ordering shown in sub-row 1354 where M<=H<=L. A user has pre-selected guardrail H (shown in reverse print) in sub-row 1354 and that selection is stored in the database. The system determines that the corresponding converse guardrail is the L guardrail in sub-row 1360 (also shown in reverse print) and applies that guardrail to the system operation.

In the “aggressive” scenario where the measurement readings are in the order H<=L<=M as represented by block 1352, the system receives input that an “aggressive” guardrail scenario applies and consults a database containing the pre-stored orderings shown in the second-from-the-right column of diagram 1300. The matching ordering shown in sub-row 1358 is identified. That ordering is related in the database to the corresponding converse ordering shown in sub-row 1356 where M<=H<=L. A user has pre-selected guardrail H (shown in reverse print) in sub-row 1356 and that selection is stored in the database. The system determines that the corresponding converse guardrail is the L guardrail in sub-row 1358 (also shown in reverse print) and applies that guardrail to the system operation.

Figure 14:
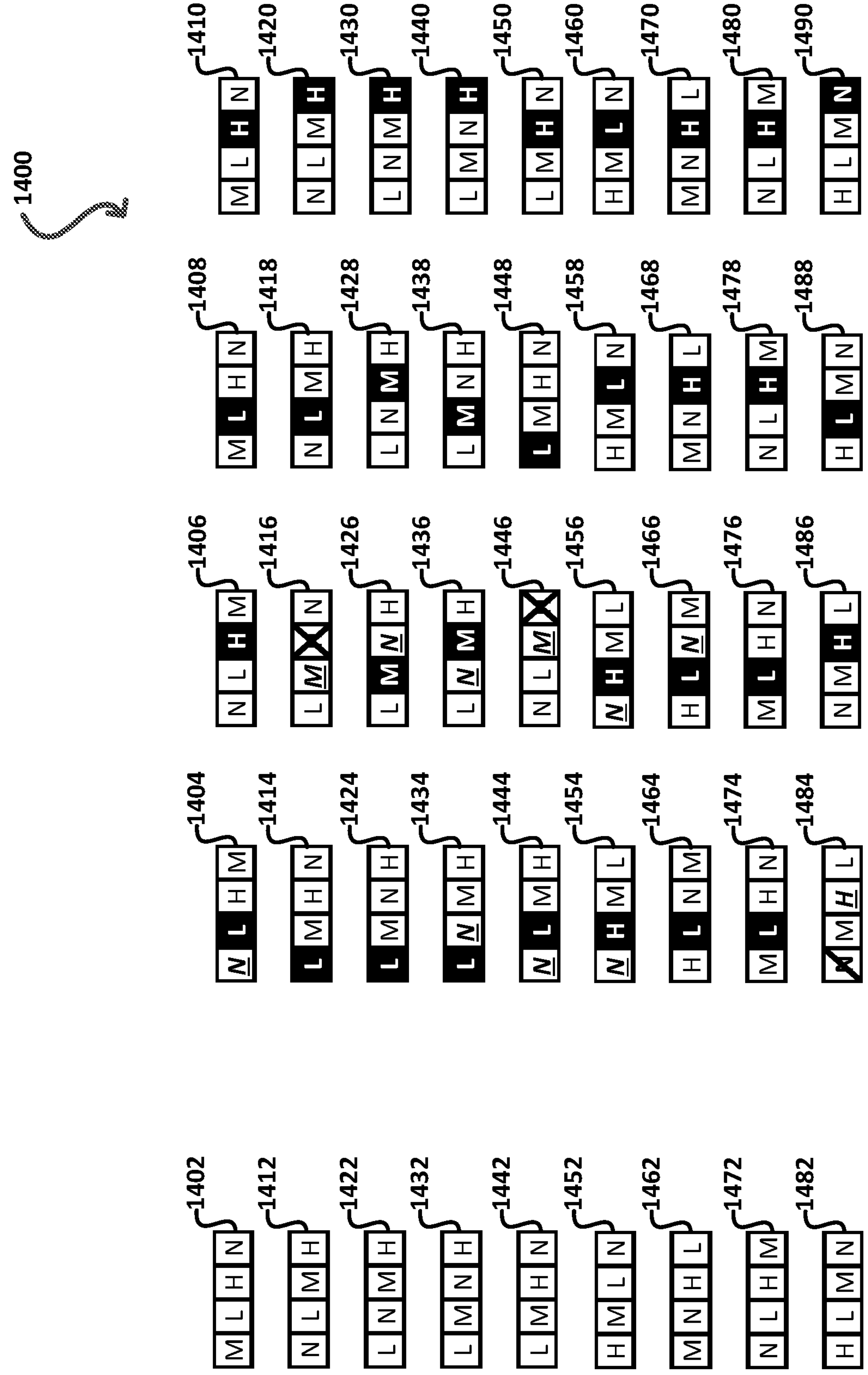
FIG. 14 shows an exemplary interface in accordance with various embodiments.

FIG. 14 is a display 1400 to which reference will be made in explaining other operational algorithms according to methods of the present invention. Display 1400 comprises five columns of four (4) ordered measurement readings L, M, N, and H shown in FIG. 8. For the purposes of explanation, the left-most column comprising blocks 1402, 1412, 1422, 1432, 1442, 1452, 1462, 1472 and 1482 show nine (9) different (amongst themselves) actual ordered measurement readings from the sensors labeled L, M, N, and H. Sub-rows 1410, 1420, 1430, 1440, 1450, 1460, 1470, 1480, and 1490 in the far-right column of display 1400, and sub-rows 1408, 1418, 1428, 1438, 1448, 1458, 1468, 1478 and 1488 in the second-from-the-right column in display 1400, also show the same pattern of nine ordered measurement readings shown in the left-most column, respectively. This is the same pattern as shown in sub-rows 862-D, 864-A, 864-B, 864-C, 864-D, 866-D, 868-C, 870-A, and 872-D in FIG. 8, respectively.

By contrast, sub-rows 1404, 1414, 1424, 1434, 1444, 1454, 1464, 1474 and 1484 in the second-from-the-left column in display 1400, and sub-rows 1406, 1416, 1426, 1436, 1446, 1456, 1466, 1476 and 1486 in the third-from-the-left column in display 1400, show nine (9) other different (amongst themselves) ordered measurement readings, with each column having the same pattern as shown in sub-rows 802-D, 804-A, 804-B, 804-C, 804-D, 806-D, 808-C, 810-A, and 812-D, respectively. While sub-rows 1404, 1414, 1424, 1434, 1444, 1454, 1464, 1474 and 1484 represent choices made by a user in a “standard” guardrail scenario, sub-rows 1406, 1416, 1426, 1436, 1446, 1456, 1466, 1476 and 1486 represent choices made by a user in an “aggressive” guardrail scenario. Similarly, while sub-rows 1410, 1420, 1430, 1440, 1450, 1460, 1470, 1480, and 1490 represent choices made by a user in a “standard” guardrail scenario, sub-rows 1408, 1418, 1428, 1438, 1448, 1458, 1468, 1478 and 1488 represent choices made by a user in an “aggressive” guardrail scenario.

Referring to display diagram 1400, a system receives four input measurements from four separate sensors L, M, N, and H and the measurement readings are in the order M<=L<=H<=N as represented by block 1402. The system also receives input that a standard guardrail scenario applies. The system consults a database containing the pre-stored orderings shown in the far-right column of diagram 1400 and identifies the matching ordering shown in sub-row 1410 where M<=L<=H<=N. That ordering is related in the database to the corresponding converse ordering shown in sub-row 1404 where N<=L<=H<=M. A user has pre-selected the L guardrail (shown in reverse print) in sub-row 1404 and that selection has been pre-stored in the database. The system determines that the corresponding converse guardrail is the H guardrail in sub-row 1410 (also shown in reverse print) and applies that guardrail to the system operation.

The system operation differs somewhat when input is received that an “aggressive” guardrail scenario applies. When the measurement readings are in the order M<=L<=H<=N as represented by block 1402, the system consults a database containing the pre-stored orderings shown in the second-from-the-right column of diagram 1400 and identifies the matching ordering shown in sub-row 1408 where M<=L<=H<=N. That ordering is related in the database to the corresponding converse ordering shown in sub-row 1406 where N<=L<=H<=M. A user has pre-selected the H guardrail (shown in reverse print) in sub-row 1406 and that selection has been pre-stored in the database. The system determines that the corresponding converse guardrail is the L guardrail in sub-row 1408 (also shown in reverse print) and applies that guardrail to the system operation.

Referring to display diagram 1400, a system receives four input measurements from four separate sensors L, M, N, and H and the measurement readings are in the order N<=L<=M<=H as represented by block 1412. The system also receives input that a standard guardrail scenario applies. The system consults a database containing the pre-stored orderings shown in the far-right column of diagram 1400 and identifies the matching ordering shown in sub-row 1420 where N<=L<=M<=H. That ordering is related in the database to the corresponding converse ordering shown in sub-row 1414 where L<=M<=H<=N. A user has pre-selected the L guardrail (shown in reverse print) in sub-row 1414 and that selection has been pre-stored in the database. The system determines that the corresponding converse guardrail is the H guardrail in sub-row 1420 (also shown in reverse print) and applies that guardrail to the system operation.

The system operation differs somewhat when input is received that an “aggressive” guardrail scenario applies. When the measurement readings are in the order N<=L<=M<=H as represented by block 1412, the system consults a database containing the pre-stored orderings shown in the second-from-the-right column of diagram 1400 and identifies the matching ordering shown in sub-row 1418 where N<=L<=M<=H. That ordering is related in the database to the corresponding converse ordering shown in sub-row 1416 where L<=M<=H<=N. A user has pre-selected the H guardrail (shown with a large X over the H guardrail) in sub-row 1416 and that selection has been pre-stored in the database. The system determines that the corresponding converse guardrail is the L guardrail in sub-row 1418 (shown in reverse print) and applies that guardrail to the system operation.

Referring to display diagram 1400, a system receives four input measurements from four separate sensors L, M, N, and H and the measurement readings are in the order L<=N<=M<=H as represented by block 1422. The system also receives input that a standard guardrail scenario applies. The system consults a database containing the pre-stored orderings shown in the far-right column of diagram 1400 and identifies the matching ordering shown in sub-row 1430 where L<=N<=M<=H. That ordering is related in the database to the corresponding converse ordering shown in sub-row 1424 where L<=M<=N<=H. A user has pre-selected the L guardrail (shown in reverse print) in sub-row 1424 and that selection has been pre-stored in the database. The system determines that the corresponding converse guardrail is the H guardrail in sub-row 1430 (also shown in reverse print) and applies that guardrail to the system operation.

The system operation differs somewhat when input is received that an “aggressive” guardrail scenario applies. When the measurement readings are in the order L<=N<=M<=H as represented by block 1422, the system consults a database containing the pre-stored orderings shown in the second-from-the-right column of diagram 1400 and identifies the matching ordering shown in sub-row 1428 where L<=N<=M<=H. That ordering is related in the database to the corresponding converse ordering shown in sub-row 1426 where L<=M<=N<=H. A user has pre-selected the M guardrail (shown in reverse print) in sub-row 1426 and that selection has been pre-stored in the database. The system determines that the corresponding converse guardrail is the M guardrail in sub-row 1428 (also shown in reverse print) and applies that guardrail to the system operation.

Referring to display diagram 1400, a system receives four input measurements from four separate sensors L, M, N, and H and the measurement readings are in the order L<=M<=N<=H as represented by block 1432. The system also receives input that a standard guardrail scenario applies. The system consults a database containing the pre-stored orderings shown in the far-right column of diagram 1400 and identifies the matching ordering shown in sub-row 1440 where L<=M<=N<=H. That ordering is related in the database to the corresponding converse ordering shown in sub-row 1434 where L<=N<=M<=H. A user has pre-selected the L guardrail (shown in reverse print) in sub-row 1434 and that selection has been pre-stored in the database. The system determines that the corresponding converse guardrail is the H guardrail in sub-row 1440 (also shown in reverse print) and applies that guardrail to the system operation.

The system operation differs somewhat when input is received that an “aggressive” guardrail scenario applies. When the measurement readings are in the order L<=M<=N<=H as represented by block 1432, the system consults a database containing the pre-stored orderings shown in the second-from-the-right column of diagram 1400 and identifies the matching ordering shown in sub-row 1438 where L<=M<=N<=H. That ordering is related in the database to the corresponding converse ordering shown in sub-row 1436 where L<=N<=M<=H. A user has pre-selected the M guardrail (shown in reverse print) in sub-row 1436 and that selection has been pre-stored in the database. The system determines that the corresponding converse guardrail is the M guardrail in sub-row 1438 (also shown in reverse print) and applies that guardrail to the system operation.

Referring to display diagram 1400, a system receives four input measurements from four separate sensors L, M, N, and H and the measurement readings are in the order L<=M<=H<=N as represented by block 1442. The system also receives input that a standard guardrail scenario applies. The system consults a database containing the pre-stored orderings shown in the far-right column of diagram 1400 and identifies the matching ordering shown in sub-row 1450 where L<=M<=H<=N. That ordering is related in the database to the corresponding converse ordering shown in sub-row 1444 where N<=L<=M<=H. A user has pre-selected the L guardrail (shown in reverse print) in sub-row 1444 and that selection has been pre-stored in the database. The system determines that the corresponding converse guardrail is the H guardrail in sub-row 1450 (also shown in reverse print) and applies that guardrail to the system operation.

The system operation differs somewhat when input is received that an “aggressive” guardrail scenario applies. When the measurement readings are in the order L<=M<=H<=N as represented by block 1442, the system consults a database containing the pre-stored orderings shown in the second-from-the-right column of diagram 1400 and identifies the matching ordering shown in sub-row 1448 where L<=M<=H<=N. That ordering is related in the database to the corresponding converse ordering shown in sub-row 1446 where N<=L<=M<=H. A user has pre-selected the H guardrail (shown with a large X over the H guardrail) in sub-row 1446 and that selection has been pre-stored in the database. The system determines that the corresponding converse guardrail is the L guardrail in sub-row 1448 (shown in reverse print) and applies that guardrail to the system operation.

Referring to display diagram 1400, a system receives four input measurements from four separate sensors L, M, N, and H and the measurement readings are in the order H<=M<=L<=N as represented by block 1452. The system also receives input that a standard guardrail scenario applies. The system consults a database containing the pre-stored orderings shown in the far-right column of diagram 1400 and identifies the matching ordering shown in sub-row 1460 where H<=M<=L<=N. That ordering is related in the database to the corresponding converse ordering shown in sub-row 1454 where N<=H<=M<=L. A user has pre-selected the H guardrail (shown in reverse print) in sub-row 1454 and that selection has been pre-stored in the database. The system determines that the corresponding converse guardrail is the L guardrail in sub-row 1460 (also shown in reverse print) and applies that guardrail to the system operation.

The system operation differs somewhat when input is received that an “aggressive” guardrail scenario applies. When the measurement readings are in the order H<=M<=L<=N as represented by block 1452, the system consults a database containing the pre-stored orderings shown in the second-from-the-right column of diagram 1400 and identifies the matching ordering shown in sub-row 1458 where H<=M<=L<=N. That ordering is related in the database to the corresponding converse ordering shown in sub-row 1456 where N<=H<=M<=L. A user has pre-selected the H guardrail (shown in reverse print) in sub-row 1456 and that selection has been pre-stored in the database. The system determines that the corresponding converse guardrail is the L guardrail in sub-row 1458 (also shown in reverse print) and applies that guardrail to the system operation.

Referring to display diagram 1400, a system receives four input measurements from four separate sensors L, M, N, and H and the measurement readings are in the order M<=N<=H<=L as represented by block 1462. The system also receives input that a standard guardrail scenario applies. The system consults a database containing the pre-stored orderings shown in the far-right column of diagram 1400 and identifies the matching ordering shown in sub-row 1470 where M<=N<=H<=L. That ordering is related in the database to the corresponding converse ordering shown in sub-row 1464 where H<=L<=N<=M. A user has pre-selected the L guardrail (shown in reverse print) in sub-row 1464 and that selection has been pre-stored in the database. The system determines that the corresponding converse guardrail is the H guardrail in sub-row 1470 (also shown in reverse print) and applies that guardrail to the system operation.

The system operation differs somewhat when input is received that an "aggressive" guardrail scenario applies. When the measurement readings are in the order M<=N<=H<=L as represented by block 1462, the system consults a database containing the pre-stored orderings shown in the second-from-the-right column of diagram 1400 and identifies the matching ordering shown in sub-row 1468 where M<=N<=H<=L. That ordering is related in the database to the corresponding converse ordering shown in sub-row 1466 where H<=L<=N<=M. A user has pre-selected the L guardrail (shown in reverse print) in sub-row 1466 and that selection has been pre-stored in the database. The system determines that the corresponding converse guardrail is the H guardrail in sub-row 1468 (also shown in reverse print) and applies that guardrail to the system operation.

Referring to display diagram 1400, a system receives four input measurements from four separate sensors L, M, N, and H and the measurement readings are in the order N<=L<=H<=M as represented by block 1472. The system also receives input that a standard guardrail scenario applies. The system consults a database containing the pre-stored orderings shown in the far-right column of diagram 1400 and identifies the matching ordering shown in sub-row 1480 where N<=L<=H<=M. That ordering is related in the database to the corresponding converse ordering shown in sub-row 1474 where M<=L<=H<=N. A user has pre-selected the L guardrail (shown in reverse print) in sub-row 1474 and that selection has been pre-stored in the database. The system determines that the corresponding converse guardrail is the H guardrail in sub-row 1480 (also shown in reverse print) and applies that guardrail to the system operation.

The system operation differs somewhat when input is received that an "aggressive" guardrail scenario applies. When the measurement readings are in the order N<=L<=H<=M as represented by block 1472, the system consults a database containing the pre-stored orderings shown in the second-from-the-right column of diagram 1400 and identifies the matching ordering shown in sub-row 1478 where N<=L<=H<=M. That ordering is related in the database to the corresponding converse ordering shown in sub-row 1476 where M<=L<=H<=N. A user has pre-selected the L guardrail (shown in reverse print) in sub-row 1476 and that selection has been pre-stored in the database. The system determines that the corresponding converse guardrail is the H guardrail in sub-row 1478 (shown in reverse print) and applies that guardrail to the system operation.

Referring to display diagram 1400, a system receives four input measurements from four separate sensors L, M, N, and H and the measurement readings are in the order H<=L<=M<=N as represented by block 1482. The system also receives input that a standard guardrail scenario applies. The system consults a database containing the pre-stored orderings shown in the far-right column of diagram 1400 and identifies the matching ordering shown in sub-row 1490 where H<=L<=M<=N. That ordering is related in the database to the corresponding converse ordering shown in sub-row 1484 where N<=M<=H<=L. A user has pre-selected the N guardrail (shown with a forward slash over the N guardrail) in sub-row 1484 and that selection has been pre-stored in the database. The system determines that the corresponding converse guardrail is the N guardrail in sub-row 1490 (shown in reverse print) and applies that guardrail to the system operation.

The system operation differs somewhat when input is received that an "aggressive" guardrail scenario applies. When the measurement readings are in the order H<=L<=M<=N as represented by block 1482, the system consults a database containing the pre-stored orderings shown in the second-from-the-right column of diagram 1400 and identifies the matching ordering shown in sub-row 1488 where H<=L<=M<=N. That ordering is related in the database to the corresponding converse ordering shown in sub-row 1486 where N<=M<=H<=L. A user has pre-selected the H guardrail (shown in reverse print) in sub-row 1486 and that selection has been pre-stored in the database. The system determines that the corresponding converse guardrail is the L guardrail in sub-row 1488 (also shown in reverse print) and applies that guardrail to the system operation.

As noted above, the methodology according to embodiments of the invention is not limited to three and four relevant market prices, and it can work exactly the same way for transitioning from four to five relevant market prices and then from five to six relevant market prices and so on. Similarly, there can be more than two levels of aggressiveness. The same principles that apply for two levels of aggressiveness can be applied to transition to ever-increasing levels of aggressiveness. Further, the specific colors described and/or illustrated herein, such as blue (dark blue, light blue, or any other variation), red, yellow, gray, or any other color can be any selected color. Moreover, other signifiers or indicia of different types of information can also be used, including without limitation other visual signifiers (such as patterns, outlining, highlighting, watermarks, font type, font size, bold text, italics text, and underlined text) as well as any other signifiers.

Although a portable computing device (e.g., a smart phone, an electronic book reader, or tablet computer) is preferable, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

Interfaces as described herein in accordance with various embodiments can include graphical user interfaces and other computer-generated interfaces that can be displayed on or otherwise using one or more displays, for example, of a user computing device or other computing device, such as a user computing device.

As will be appreciated, although a Web-based environment is used for purposes of explanation, different environments may be used, as appropriate, to implement various embodiments. Any appropriate computer network, including an intranet, the Internet, a cellular network, a local area network, or any other such network or combination thereof could be utilized. Components used for such a system can depend at least in part upon the type of network and/or environment selected. Protocols and components for communicating via such a network are well known and will not be discussed herein in detail. Communication over the network can be enabled via wired or wireless connections and combinations thereof.

It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment.

The data store can include several separate data tables, databases, or other data storage mechanisms and media for storing data relating to a particular aspect.

Each server can include an operating system that provides executable program instructions for the general administration and operation of that server and can include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one or more embodiments is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems, and other devices capable of communicating via a network.

Embodiments can utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, or any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python, or TCL, as well as combinations thereof. The server(s) may also include database servers, including without limitation those commercially available from Oracle®, Microsoft®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element, or keypad) and at least one output device (e.g., a display device, printer, or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed, and/or removable storage devices as well as storage media for temporarily and/or more permanently containing, storing, transmitting, and retrieving computer-readable information. The system and various devices also can include a number of software applications, modules, services, or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

R23. An automated measurement method comprising the steps of:

receiving a tolerance-adjusted low measurement from a first instrument;

receiving a tolerance-adjusted high measurement from said first instrument;

receiving a middle measurement from a second instrument;

determining that said tolerance-adjusted low measurement is less than said middle measurement;

determining that said middle measurement is less than said tolerance-adjusted high measurement;

retrieving, from a data storage containing a plurality of preselected user preferences for maximum output based on three measurements, a preselected user maximum-output preference for a second tolerance-adjusted high measurement from said first instrument in response to a second tolerance-adjusted low measurement from said first instrument less than a second middle measurement from said second instrument less than said second tolerance-adjusted high measurement;

transmitting a minimum output signal to a control system based on said tolerance-adjusted low measurement; and limiting the minimum output of an apparatus with said control system based on said minimum output signal.

R24. The automated measurement method of claim R23 wherein the step of limiting the minimum output of an apparatus comprises limiting a minimum transfer amount from a fluid transfer apparatus with said control system based on said minimum output signal.

R25. The automated measurement method of claim R23 wherein the step of limiting the minimum output of an apparatus comprises setting a processing minimum guardrail for an automated trading system.

R26. An automated measurement method comprising the steps of:

receiving a tolerance-adjusted low measurement from a first instrument;

receiving a tolerance-adjusted high measurement from said first instrument;

receiving a middle measurement from a second instrument;

determining that said tolerance-adjusted high measurement is less than said middle measurement;

determining that said middle measurement is less than said tolerance-adjusted low measurement;

retrieving, from a data storage containing a plurality of preselected user preferences for maximum output based on three measurements, a preselected user maximum-output preference for a second tolerance-adjusted high measurement from said first instrument in response to said second tolerance-adjusted high measurement less than a second middle measurement from said second instrument less than a second tolerance-adjusted low measurement from said first instrument;

transmitting a minimum output signal to a control system based on said tolerance-adjusted low measurement; and limiting the minimum output of an apparatus with said control system based on said minimum output signal.

R27. The automated measurement method of claim R26 wherein the step of limiting the minimum output of an apparatus comprises limiting a minimum transfer amount from a fluid transfer apparatus with said control system based on said minimum output signal R28. The automated measurement method of claim R26 wherein the step of limiting the minimum output of an apparatus comprises setting a processing minimum guardrail for an automated trading system.

R29. An automated measurement method comprising the steps of:

receiving a tolerance-adjusted low measurement from a first instrument;

receiving a tolerance-adjusted high measurement from said first instrument;

receiving a middle measurement from a second instrument;

determining that said middle measurement is less than said tolerance-adjusted high measurement;

determining that said tolerance-adjusted high measurement is less than said tolerance-adjusted low measurement;

retrieving, from a data storage containing a plurality of preselected user preferences for maximum output based on three measurements, a preselected user maximum-output preference for a second tolerance-adjusted low measurement from said first instrument in response to a second tolerance-adjusted high measurement from said first instrument less than said second tolerance-adjusted low measurement less than a second middle measurement from said second instrument;

transmitting a minimum output signal to a control system based on said tolerance-adjusted high measurement; and limiting the minimum output of an apparatus with said control system based on said minimum output signal.

R30. The automated measurement method of claim R29 wherein the step of limiting the minimum output of an apparatus comprises limiting a minimum transfer amount from a fluid transfer apparatus with said control system based on said minimum output signal.

R31. The automated measurement method of claim R29 wherein the step of limiting the minimum output of an apparatus comprises setting a processing minimum guardrail for an automated trading system.

R32. An automated measurement method comprising the steps of:

receiving a tolerance-adjusted low measurement from a first instrument;

receiving a tolerance-adjusted high measurement from said first instrument;

receiving a middle measurement from a second instrument;

determining that said tolerance-adjusted low measurement is less than said tolerance-adjusted high measurement;

determining that said tolerance-adjusted high measurement is less than said middle measurement;

retrieving, from a data storage containing a plurality of preselected user preferences for maximum output based on three measurements, a preselected user maximum-output preference for a second tolerance-adjusted low measurement from said first instrument in response to a second middle measurement from said second instrument less than said second tolerance-adjusted low measurement less than a second tolerance-adjusted high measurement from said first instrument;

transmitting a minimum output signal to a control system based on said tolerance-adjusted high measurement; and limiting the minimum output of an apparatus with said control system based on said minimum output signal.

R33. The automated measurement method of claim R32 wherein the step of limiting the minimum output of an apparatus comprises limiting a minimum transfer amount from a fluid transfer apparatus with said control system based on said minimum output signal.

R34. The automated measurement method of claim R32 wherein the step of limiting the minimum output of an apparatus comprises setting a processing minimum guardrail for an automated trading system.

R35. An automated measurement method comprising the steps of:

receiving a tolerance-adjusted low measurement from a first instrument;

receiving a tolerance-adjusted high measurement from said first instrument;

receiving a middle measurement from a second instrument;

determining that said tolerance-adjusted high measurement is less than said tolerance-adjusted low measurement;

determining that said tolerance-adjusted low measurement is less than said middle measurement;

retrieving, from a data storage containing a plurality of preselected user preferences for maximum output based on three measurements, a preselected user maximum-output preference for a second tolerance-adjusted high measurement from said first instrument in response to a second middle measurement from said second instrument less than said second tolerance-adjusted high measurement less than a second tolerance-adjusted low measurement from said first instrument;

transmitting a minimum output signal to a control system based on said tolerance-adjusted low measurement; and limiting the minimum output of an apparatus with said control system based on said minimum output signal.

R36. The automated measurement method of claim R35 wherein the step of limiting the minimum output of an apparatus comprises limiting a minimum transfer amount from a fluid transfer apparatus with said control system based on said minimum output signal.

R37. The automated measurement method of claim R35 wherein the step of limiting the minimum output of an apparatus comprises setting a processing minimum guardrail for an automated trading system.

R38. An automated measurement method comprising the steps of:

receiving a tolerance-adjusted low measurement from a first instrument;

receiving a tolerance-adjusted high measurement from said first instrument;

receiving a middle measurement from a second instrument;

receiving an alternate middle measurement from a third instrument;

determining that said middle measurement is less than said tolerance-adjusted low measurement;

determining that said tolerance-adjusted low measurement is less than said tolerance-adjusted high measurement;

determining that said tolerance-adjusted high measurement is less than said alternate middle measurement;

retrieving, from a data storage containing a plurality of preselected user preferences for maximum output based on four measurements, a preselected user maximum-output preference for a second tolerance-adjusted low measurement from said first instrument in response to a second alternate middle measurement from said third instrument less than said second tolerance-adjusted low measurement less than a second tolerance-adjusted high measurement from said first instrument less than a second middle measurement from said second instrument;

transmitting a minimum output signal to a control system based on said tolerance-adjusted high measurement; and limiting the minimum output of an apparatus with said control system based on said minimum output signal.

R39. The automated measurement method of claim R38 wherein the step of limiting the minimum output of an apparatus comprises limiting a minimum transfer amount from a fluid transfer apparatus with said control system based on said minimum output signal.

R40. The automated measurement method of claim R38 wherein the step of limiting the minimum output of an apparatus comprises setting a processing minimum guardrail for an automated trading system.

R41. An automated measurement method comprising the steps of:

receiving a tolerance-adjusted low measurement from a first instrument;

receiving a tolerance-adjusted high measurement from said first instrument;

receiving a middle measurement from a second instrument;

receiving an alternate middle measurement from a third instrument;

determining that said alternate middle measurement is less than said tolerance-adjusted low measurement;

determining that said tolerance-adjusted low measurement is less than said middle measurement;

determining that said middle measurement is less than said tolerance-adjusted high measurement;

retrieving, from a data storage containing a plurality of preselected user preferences for maximum output based on four measurements, a preselected user maximum-output preference for a second tolerance-adjusted low measurement from said first instrument in response to said second tolerance-adjusted low measurement less than a second middle measurement from said second instrument less than a second tolerance-adjusted high measurement from said first instrument less than a second alternate middle measurement from said third instrument;

transmitting a minimum output signal to a control system based on said tolerance-adjusted high measurement; and limiting the minimum output of an apparatus with said control system based on said minimum output signal.

R42. The automated measurement method of claim R41 wherein the step of limiting the minimum output of an apparatus comprises limiting a minimum transfer amount from a fluid transfer apparatus with said control system based on said minimum output signal.

R43. The automated measurement method of claim R41 wherein the step of limiting the minimum output of an apparatus comprises setting a processing minimum guardrail for an automated trading system.

R44. An automated measurement method comprising the steps of:

receiving a tolerance-adjusted low measurement from a first instrument;

receiving a tolerance-adjusted high measurement from said first instrument;

receiving a middle measurement from a second instrument;

receiving an alternate middle measurement from a third instrument;

determining that said alternate middle measurement is less than said tolerance-adjusted low measurement;

determining that said tolerance-adjusted low measurement is less than said middle measurement;

determining that said middle measurement is less than said tolerance-adjusted high measurement;

retrieving, from a data storage containing a plurality of preselected user preferences for maximum output based on four measurements, a preselected user maximum-output preference for a second tolerance-adjusted high measurement from said first instrument in response to a second tolerance-adjusted low measurement from said first instrument less than a second middle measurement from said second instrument less than said second tolerance-adjusted high measurement less than a second alternate middle measurement from said third instrument;

transmitting a minimum output signal to a control system based on said tolerance-adjusted low measurement; and limiting the minimum output of an apparatus with said control system based on said minimum output signal.

R45. The automated measurement method of claim R44 wherein the step of limiting the minimum output of an apparatus comprises limiting a minimum transfer amount from a fluid transfer apparatus with said control system based on said minimum output signal.

R46. The automated measurement method of claim R44 wherein the step of limiting the minimum output of an apparatus comprises setting a processing minimum guardrail for an automated trading system.

R47. An automated measurement method comprising the steps of:

receiving a tolerance-adjusted low measurement from a first instrument;

receiving a tolerance-adjusted high measurement from said first instrument;

receiving a middle measurement from a second instrument;

receiving an alternate middle measurement from a third instrument;

determining that said tolerance-adjusted low measurement is less than said alternate middle measurement;

determining that said alternate middle measurement is less than said middle measurement;

determining that said middle measurement is less than said tolerance-adjusted high measurement;

retrieving, from a data storage containing a plurality of preselected user preferences for maximum output based on four measurements, a preselected user maximum-output preference for a second tolerance-adjusted low measurement from said first instrument in response to said second tolerance-adjusted low measurement less than a second middle measurement from said second instrument less than a second alternate middle measurement from said third instrument less than a second tolerance-adjusted high measurement from said first instrument;

transmitting a minimum output signal to a control system based on said tolerance-adjusted high measurement; and limiting the minimum output of an apparatus with said control system based on said minimum output signal.

R48. The automated measurement method of claim R47 wherein the step of limiting the minimum output of an apparatus comprises limiting a minimum transfer amount from a fluid transfer apparatus with said control system based on said minimum output signal.

R49. The automated measurement method of claim R47 wherein the step of limiting the minimum output of an apparatus comprises setting a processing minimum guardrail for an automated trading system.

R50. An automated measurement method comprising the steps of:

receiving a tolerance-adjusted low measurement from a first instrument;

receiving a tolerance-adjusted high measurement from said first instrument;

receiving a middle measurement from a second instrument;

receiving an alternate middle measurement from a third instrument;

determining that said tolerance-adjusted low measurement is less than said alternate middle measurement;

determining that said alternate middle measurement is less than said middle measurement;

determining that said middle measurement is less than said tolerance-adjusted high measurement;

retrieving, from a data storage containing a plurality of preselected user preferences for maximum output based on four measurements, a preselected user maximum-output preference for a second middle measurement from said second instrument in response to a second tolerance-adjusted low measurement from said first instrument less than said second middle measurement less than a second alternate middle measurement from said third instrument less than a second tolerance-adjusted high measurement from said first instrument;

transmitting a minimum output signal to a control system based on said middle measurement; and limiting the minimum output of an apparatus with said control system based on said minimum output signal.

R51. The automated measurement method of claim R50 wherein the step of limiting the minimum output of an apparatus comprises limiting a minimum transfer amount from a fluid transfer apparatus with said control system based on said minimum output signal.

R52. The automated measurement method of claim R50 wherein the step of limiting the minimum output of an apparatus comprises setting a processing minimum guardrail for an automated trading system.

R53. An automated measurement method comprising the steps of:

receiving a tolerance-adjusted low measurement from a first instrument;

receiving a tolerance-adjusted high measurement from said first instrument;

receiving a middle measurement from a second instrument;

receiving an alternate middle measurement from a third instrument;

determining that said tolerance-adjusted low measurement is less than said alternate middle measurement;
determining that said alternate middle measurement is less than said middle measurement;
determining that said middle measurement is less than said tolerance-adjusted high measurement;
retrieving, from a data storage containing a plurality of preselected user preferences for maximum output based on four measurements, a preselected user maximum-output preference for a second alternate middle measurement from said third instrument in response to a second tolerance-adjusted low measurement from said first instrument less than a second middle measurement from said second instrument less than said second alternate middle measurement less than a second tolerance-adjusted high measurement from said first instrument;
transmitting a minimum output signal to a control system based on said alternate middle measurement; and
limiting the minimum output of an apparatus with said control system based on said minimum output signal.

R54. The automated measurement method of claim R53 wherein the step of limiting the minimum output of an apparatus comprises limiting a minimum transfer amount from a fluid transfer apparatus with said control system based on said minimum output signal.

R55. The automated measurement method of claim R53 wherein the step of limiting the minimum output of an apparatus comprises setting a processing minimum guardrail for an automated trading system.

R56. An automated measurement method comprising the steps of:
receiving a tolerance-adjusted low measurement from a first instrument;
receiving a tolerance-adjusted high measurement from said first instrument;
receiving a middle measurement from a second instrument;
receiving an alternate middle measurement from a third instrument;
determining that said tolerance-adjusted low measurement is less than said alternate middle measurement;
determining that said alternate middle measurement is less than said middle measurement;
determining that said middle measurement is less than said tolerance-adjusted high measurement;
retrieving, from a data storage containing a plurality of preselected user preferences for maximum output based on four measurements, a preselected user maximum-output preference for a second tolerance-adjusted high measurement from said first instrument in response to a second tolerance-adjusted low measurement from said first instrument less than a second middle measurement from said second instrument less than a second alternate middle measurement from said third instrument less than said second tolerance-adjusted high measurement;
transmitting a minimum output signal to a control system based on said tolerance-adjusted low measurement; and
limiting the minimum output of an apparatus with said control system based on said minimum output signal.

R57. The automated measurement method of claim R56 wherein the step of limiting the minimum output of an apparatus comprises limiting a minimum transfer amount from a fluid transfer apparatus with said control system based on said minimum output signal.

R58. The automated measurement method of claim R56 wherein the step of limiting the minimum output of an apparatus comprises setting a processing minimum guardrail for an automated trading system.

R59. An automated measurement method comprising the steps of:
receiving a tolerance-adjusted low measurement from a first instrument;
receiving a tolerance-adjusted high measurement from said first instrument;
receiving a middle measurement from a second instrument;
receiving an alternate middle measurement from a third instrument;
determining that said tolerance-adjusted low measurement is less than said middle measurement;
determining that said middle measurement is less than said alternate middle measurement;
determining that said alternate middle measurement is less than said tolerance-adjusted high measurement;
retrieving, from a data storage containing a plurality of preselected user preferences for maximum output based on four measurements, a preselected user maximum-output preference for a second tolerance-adjusted low measurement from said first instrument in response to said second tolerance-adjusted low measurement less than a second alternate middle measurement from said third instrument less than a second middle measurement from said second instrument less than a second tolerance-adjusted high measurement from said first instrument;
transmitting a minimum output signal to a control system based on said tolerance-adjusted high measurement; and
limiting the minimum output of an apparatus with said control system based on said minimum output signal.

R60. The automated measurement method of claim R59 wherein the step of limiting the minimum output of an apparatus comprises limiting a minimum transfer amount from a fluid transfer apparatus with said control system based on said minimum output signal.

R61. The automated measurement method of claim R59 wherein the step of limiting the minimum output of an apparatus comprises setting a processing minimum guardrail for an automated trading system.

R62. An automated measurement method comprising the steps of:
receiving a tolerance-adjusted low measurement from a first instrument;
receiving a tolerance-adjusted high measurement from said first instrument;
receiving a middle measurement from a second instrument;
receiving an alternate middle measurement from a third instrument;
determining that said tolerance-adjusted low measurement is less than said middle measurement;
determining that said middle measurement is less than said alternate middle measurement;
determining that said alternate middle measurement is less than said tolerance-adjusted high measurement;
retrieving, from a data storage containing a plurality of preselected user preferences for maximum output based on four measurements, a preselected user maximum-output preference for a second tolerance-adjusted high measurement from said first instrument in response to a second tolerance-adjusted low measurement from said first instrument less than a second alternate middle measurement from said third instrument less than a second middle measurement from said second instrument less than said second tolerance-adjusted high measurement;

transmitting a minimum output signal to a control system based on said tolerance-adjusted low measurement; and limiting the minimum output of an apparatus with said control system based on said minimum output signal.

R63. The automated measurement method of claim R62 wherein the step of limiting the minimum output of an apparatus comprises limiting a minimum transfer amount from a fluid transfer apparatus with said control system based on said minimum output signal.

R64. The automated measurement method of claim R62 wherein the step of limiting the minimum output of an apparatus comprises setting a processing minimum guardrail for an automated trading system.

R65. An automated measurement method comprising the steps of:

receiving a tolerance-adjusted low measurement from a first instrument;

receiving a tolerance-adjusted high measurement from said first instrument;

receiving a middle measurement from a second instrument;

receiving an alternate middle measurement from a third instrument;

determining that said tolerance-adjusted low measurement is less than said middle measurement;

determining that said middle measurement is less than said tolerance-adjusted high measurement;

determining that said tolerance-adjusted high measurement is less than said alternate middle measurement;

retrieving, from a data storage containing a plurality of preselected user preferences for maximum output based on four measurements, a preselected user maximum-output preference for a second tolerance-adjusted low measurement from said first instrument in response to a second alternate middle measurement from said third instrument less than said second tolerance-adjusted low measurement less than a second middle measurement from said second instrument less than a second tolerance-adjusted high measurement from said first instrument;

transmitting a minimum output signal to a control system based on said tolerance-adjusted high measurement; and limiting the minimum output of an apparatus with said control system based on said minimum output signal.

R66. The automated measurement method of claim R65 wherein the step of limiting the minimum output of an apparatus comprises limiting a minimum transfer amount from a fluid transfer apparatus with said control system based on said minimum output signal.

R67. The automated measurement method of claim R65 wherein the step of limiting the minimum output of an apparatus comprises setting a processing minimum guardrail for an automated trading system.

R68. An automated measurement method comprising the steps of:

receiving a tolerance-adjusted low measurement from a first instrument;

receiving a tolerance-adjusted high measurement from said first instrument;

receiving a middle measurement from a second instrument;

receiving an alternate middle measurement from a third instrument;

determining that said tolerance-adjusted low measurement is less than said middle measurement;

determining that said middle measurement is less than said tolerance-adjusted high measurement;

determining that said tolerance-adjusted high measurement is less than said alternate middle measurement;

retrieving, from a data storage containing a plurality of preselected user preferences for maximum output based on four measurements, a preselected user maximum-output preference for a second tolerance-adjusted high measurement from said first instrument in response to a second alternate middle measurement from said third instrument less than a second tolerance-adjusted low measurement from said first instrument less than a second middle measurement from said second instrument less than said second tolerance-adjusted high measurement;

transmitting a minimum output signal to a control system based on said tolerance-adjusted low measurement; and limiting the minimum output of an apparatus with said control system based on said minimum output signal.

R69. The automated measurement method of claim R68 wherein the step of limiting the minimum output of an apparatus comprises limiting a minimum transfer amount from a fluid transfer apparatus with said control system based on said minimum output signal.

R70. The automated measurement method of claim R68 wherein the step of limiting the minimum output of an apparatus comprises setting a processing minimum guardrail for an automated trading system.

R71. An automated measurement method comprising the steps of:

receiving a tolerance-adjusted low measurement from a first instrument;

receiving a tolerance-adjusted high measurement from said first instrument;

receiving a middle measurement from a second instrument;

receiving an alternate middle measurement from a third instrument;

determining that said tolerance-adjusted high measurement is less than said middle measurement;

determining that said middle measurement is less than said tolerance-adjusted low measurement;

determining that said tolerance-adjusted low measurement is less than said alternate middle measurement;

retrieving, from a data storage containing a plurality of preselected user preferences for maximum output based on four measurements, a preselected user maximum-output preference for a second tolerance-adjusted high measurement from said first instrument in response to a second alternate middle measurement from said third instrument less than said second tolerance-adjusted high measurement less than a second middle measurement from said second instrument less than a second tolerance-adjusted low measurement from said first instrument;

transmitting a minimum output signal to a control system based on said tolerance-adjusted low measurement; and limiting the minimum output of an apparatus with said control system based on said minimum output signal.

R72. The automated measurement method of claim R71 wherein the step of limiting the minimum output of an apparatus comprises limiting a minimum transfer amount from a fluid transfer apparatus with said control system based on said minimum output signal.

R73. The automated measurement method of claim R71 wherein the step of limiting the minimum output of an apparatus comprises setting a processing minimum guardrail for an automated trading system.

R74. An automated measurement method comprising the steps of:

receiving a tolerance-adjusted low measurement from a first instrument;

receiving a tolerance-adjusted high measurement from said first instrument;

receiving a middle measurement from a second instrument;

receiving an alternate middle measurement from a third instrument;

determining that said middle measurement is less than said alternate middle measurement;

determining that said alternate middle measurement is less than said tolerance-adjusted high measurement;

determining that said tolerance-adjusted high measurement is less than said tolerance-adjusted low measurement;

retrieving, from a data storage containing a plurality of preselected user preferences for maximum output based on four measurements, a preselected user maximum-output preference for a second tolerance-adjusted low measurement from said first instrument in response to a second tolerance-adjusted high measurement from said first instrument less than said second tolerance-adjusted low measurement less than a second alternate middle measurement from said third instrument less than a second middle measurement from said second instrument;

transmitting a minimum output signal to a control system based on said tolerance-adjusted high measurement; and limiting the minimum output of an apparatus with said control system based on said minimum output signal.

R75. The automated measurement method of claim R74 wherein the step of limiting the minimum output of an apparatus comprises limiting a minimum transfer amount from a fluid transfer apparatus with said control system based on said minimum output signal.

R76. The automated measurement method of claim R74 wherein the step of limiting the minimum output of an apparatus comprises setting a processing minimum guardrail for an automated trading system.

R77. An automated measurement method comprising the steps of:

receiving a tolerance-adjusted low measurement from a first instrument;

receiving a tolerance-adjusted high measurement from said first instrument;

receiving a middle measurement from a second instrument;

receiving an alternate middle measurement from a third instrument;

determining that said alternate middle measurement is less than said tolerance-adjusted low measurement;

determining that said tolerance-adjusted low measurement is less than said tolerance-adjusted high measurement;

determining that said tolerance-adjusted high measurement is less than said middle measurement;

retrieving, from a data storage containing a plurality of preselected user preferences for maximum output based on four measurements, a preselected user maximum-output preference for a second tolerance-adjusted low measurement from said first instrument in response to a second middle measurement from said second instrument less than said second tolerance-adjusted low measurement less than a second tolerance-adjusted high measurement from said first instrument less than a second alternate middle measurement from said third instrument;

transmitting a minimum output signal to a control system based on said tolerance-adjusted high measurement; and limiting the minimum output of an apparatus with said control system based on said minimum output signal.

R78. The automated measurement method of claim R77 wherein the step of limiting the minimum output of an apparatus comprises limiting a minimum transfer amount from a fluid transfer apparatus with said control system based on said minimum output signal.

R79. The automated measurement method of claim R77 wherein the step of limiting the minimum output of an apparatus comprises setting a processing minimum guardrail for an automated trading system.

R80. An automated measurement method comprising the steps of:

receiving a tolerance-adjusted low measurement from a first instrument;

receiving a tolerance-adjusted high measurement from said first instrument;

receiving a middle measurement from a second instrument;

receiving an alternate middle measurement from a third instrument;

determining that said tolerance-adjusted high measurement is less than said tolerance-adjusted low measurement;

determining that said tolerance-adjusted low measurement is less than said middle measurement;

determining that said middle measurement is less than said alternate middle measurement;

retrieving, from a data storage containing a plurality of preselected user preferences for maximum output based on four measurements, a preselected user maximum-output preference for a second alternate middle measurement from said third instrument in response to said second alternate middle measurement less than a second middle measurement from said second instrument less than a second tolerance-adjusted high measurement from said first instrument less than a second tolerance-adjusted low measurement from said first instrument;

transmitting a minimum output signal to a control system based on said second alternate middle measurement; and limiting the minimum output of an apparatus with said control system based on said minimum output signal.

R81. The automated measurement method of claim R80 wherein the step of limiting the minimum output of an apparatus comprises limiting a minimum transfer amount from a fluid transfer apparatus with said control system based on said minimum output signal.

R82. The automated measurement method of claim R80 wherein the step of limiting the minimum output of an apparatus comprises setting a processing minimum guardrail for an automated trading system.

What is claimed is:

1. An automated measurement method comprising the steps of:

receiving a tolerance-adjusted low measurement from a first instrument;

receiving a tolerance-adjusted high measurement from said first instrument;

receiving a middle measurement from a second instrument;

determining that said middle measurement is less than said tolerance-adjusted low measurement;

determining that said tolerance-adjusted low measurement is less than said tolerance-adjusted high measurement;

retrieving, from a data storage containing a plurality of preselected user preferences for maximum output based on three measurements, a preselected user maximum-output preference for a second tolerance-adjusted low measurement from said first instrument in response to said second tolerance-adjusted low measurement less than a second tolerance-adjusted high measurement from said first instrument less than a second middle measurement from said second instrument;

transmitting a minimum output signal to a control system based on said preselected user maximum-output preference for the second tolerance-adjusted low measurement; and limiting the minimum output of an apparatus with said control system based on said minimum output signal.

2. The automated measurement method of claim 1 wherein the step of limiting the minimum output of an apparatus comprises limiting a minimum transfer amount from a fluid transfer apparatus with said control system based on said minimum output signal.

3. The automated measurement method of claim 1 wherein the step of limiting the minimum output of an apparatus comprises setting a processing minimum guardrail for an automated trading system.

4. An automated measurement method comprising the steps of:

receiving a tolerance-adjusted low measurement from a first instrument;

receiving a tolerance-adjusted high measurement from said first instrument;

receiving a middle measurement from a second instrument;

determining that said middle measurement is less than said tolerance-adjusted low measurement;

determining that said tolerance-adjusted low measurement is less than said tolerance-adjusted high measurement;

retrieving, from a data storage containing a plurality of preselected user preferences for maximum output based on three measurements, a preselected user maximum-output preference for a second tolerance-adjusted high measurement from said first instrument in response to a second tolerance-adjusted low measurement from said first instrument less than said second tolerance-adjusted high measurement less than a second middle measurement from said second instrument;

transmitting a minimum output signal to a control system based on said preselected user maximum-output preference for the second tolerance-adjusted high measurement; and limiting the minimum output of an apparatus with said control system based on said minimum output signal.

5. The automated measurement method of claim 4 wherein the step of limiting the minimum output of an apparatus comprises limiting a minimum transfer amount from a fluid transfer apparatus with said control system based on said minimum output signal.

6. The automated measurement method of claim 4 wherein the step of limiting the minimum output of an apparatus comprises setting a processing minimum guardrail for an automated trading system.

7. An automated measurement method comprising the steps of:

receiving a tolerance-adjusted low measurement from a first instrument;

receiving a tolerance-adjusted high measurement from said first instrument;

receiving a middle measurement from a second instrument;

determining that said tolerance-adjusted low measurement is less than said middle measurement;

determining that said middle measurement is less than said tolerance-adjusted high measurement;

retrieving, from a data storage containing a plurality of preselected user preferences for maximum output based on three measurements, a preselected user maximum-output preference for a second tolerance-adjusted low measurement from said first instrument in response to said second tolerance-adjusted low measurement less than a second middle measurement from said second instrument less than a second tolerance-adjusted high measurement from said first instrument;

transmitting a minimum output signal to a control system based on said preselected user maximum-output preference for the second tolerance-adjusted low measurement; and limiting the minimum output of an apparatus with said control system based on said minimum output signal.

8. The automated measurement method of claim 7 wherein the step of limiting the minimum output of an apparatus comprises limiting a minimum transfer amount from a fluid transfer apparatus with said control system based on said minimum output signal.

9. The automated measurement method of claim 7 wherein the step of limiting the minimum output of an apparatus comprises setting a processing minimum guardrail for an automated trading system.

10. An automated measurement method comprising the steps of:

receiving a tolerance-adjusted low measurement from a first instrument;

receiving a tolerance-adjusted high measurement from said first instrument;

receiving a middle measurement from a second instrument;

determining that said tolerance-adjusted low measurement is less than said middle measurement;

determining that said middle measurement is less than said tolerance-adjusted high measurement;

retrieving, from a data storage containing a plurality of preselected user preferences for maximum output based on three measurements, a preselected user maximum-output preference for a second middle measurement from said second instrument in response to a second tolerance-adjusted low measurement less than said second middle measurement less than said second tolerance-adjusted high measurement from said first instrument;

transmitting a minimum output signal to a control system based on said preselected user maximum-output preference for the second middle measurement; and limiting the minimum output of an apparatus with said control system based on said minimum output signal.

11. The automated measurement method of claim 10 wherein the step of limiting the minimum output of an apparatus comprises limiting a minimum transfer amount from a fluid transfer apparatus with said control system based on said minimum output signal.

12. The automated measurement method of claim 10 wherein the step of limiting the minimum output of an apparatus comprises setting a processing minimum guardrail for an automated trading system.

* * * * *